US012554349B2

(12) United States Patent
Wang et al.

(10) Patent No.: US 12,554,349 B2
(45) Date of Patent: Feb. 17, 2026

(54) TOUCH DISPLAY SUBSTRATE, DRIVE METHOD THEREFOR, AND TOUCH DISPLAY APPARATUS

(71) Applicants: Chongqing BOE Display Technology Co., Ltd., Chongqing (CN); BOE Technology Group Co., Ltd., Beijing (CN)

(72) Inventors: Rui Wang, Beijing (CN); Chao Zeng, Beijing (CN); Shouqiang Zhang, Beijing (CN); Ming Hu, Beijing (CN)

(73) Assignees: Chongqing BOE Display Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 42 days.

(21) Appl. No.: 18/699,599

(22) PCT Filed: Apr. 23, 2023

(86) PCT No.: PCT/CN2023/090128
§ 371 (c)(1),
(2) Date: Apr. 9, 2024

(87) PCT Pub. No.: WO2024/221139
PCT Pub. Date: Oct. 31, 2024

(65) Prior Publication Data
US 2025/0231632 A1 Jul. 17, 2025

(51) Int. Cl.
G06F 3/044 (2006.01)
G06F 3/041 (2006.01)
H10K 59/40 (2023.01)

(52) U.S. Cl.
CPC ........ *G06F 3/0412* (2013.01); *G06F 3/04164* (2019.05); *G06F 3/04184* (2019.05);
(Continued)

(58) Field of Classification Search
None
See application file for complete search history.

(56) References Cited

U.S. PATENT DOCUMENTS

2013/0135256 A1* 5/2013 Hong .................... G06F 3/0445
345/76
2016/0103649 A1* 4/2016 Yoshitani .............. G06F 3/0412
345/694

(Continued)

FOREIGN PATENT DOCUMENTS

CN 104035640 A 9/2014
CN 105094491 A 11/2015

(Continued)

*Primary Examiner* — Duane N Taylor, Jr.
(74) *Attorney, Agent, or Firm* — Ling Wu; Stephen Yang; Ling and Yang Intellectual Property

(57) ABSTRACT

Disclosed are a touch display substrate, a drive method therefor, and a touch display apparatus. The touch display substrate includes a base substrate, and a touch lead layer, an anode conductive layer, and a cathode conductive layer disposed on the base substrate, the anode conductive layer is located between the touch lead layer and the cathode conductive layer on a plane perpendicular to the base substrate, the anode conductive layer includes a plurality of transfer connection electrodes, the touch lead layer includes a plurality of touch leads, and the cathode conductive layer includes a plurality of cathodes; the plurality of cathodes are multiplexed as a plurality of touch electrodes, the plurality of touch electrodes are electrically connected with the plurality of touch leads through the plurality of transfer connection electrodes, and at least part of the touch leads are located in a display region (AA) of the touch display substrate.

20 Claims, 13 Drawing Sheets

(52) U.S. Cl.
CPC ........... *G06F 3/0446* (2019.05); *H10K 59/40* (2023.02); *G06F 2203/04103* (2013.01)

(56) References Cited

U.S. PATENT DOCUMENTS

2017/0308212 A1* 10/2017 Jin ....................... H10K 59/131
2019/0037682 A1*  1/2019 Tsai ................... G06V 40/1306
2019/0155430 A1*  5/2019 Hwang ................. G06F 3/0416

FOREIGN PATENT DOCUMENTS

| | | | | |
|---|---|---|---|---|
| CN | 205353991 U | 6/2016 | | |
| CN | 107168578 A | 9/2017 | | |
| CN | 107992225 A | 5/2018 | | |
| CN | 108258148 A | 7/2018 | | |
| CN | 108389883 A | 8/2018 | | |
| CN | 208489194 U | 2/2019 | | |
| CN | 110442255 B | 8/2021 | | |
| CN | 109559679 B | * | 7/2024 | ............. G06F 3/044 |
| KR | 10-2015-0029903 A | 3/2015 | | |

\* cited by examiner

TOUCH DISPLAY SUBSTRATE, DRIVE METHOD THEREFOR, AND TOUCH DISPLAY APPARATUS

CROSS-REFERENCE TO RELATED APPLICATION

The present application is a U.S. National Phase Entry of International Application No. PCT/CN2023/090128 having an international filing date of Apr. 23, 2023, contents of which should be interpreted as being incorporated into the present application by reference.

TECHNICAL FIELD

The present disclosure relates to, but is not limited to, the field of display technologies, in particular to a touch display substrate and a drive method therefor, and a touch display apparatus.

BACKGROUND

With rapid development of display technologies, touch screens have been gradually widespread in people's daily life. According to constituent structures, types of touch screens may be divided into Add on Mode type, On Cell, In Cell, and so on. According to working principles thereof, types of touch screens may be divided into a capacitive type, a resistive type, an infrared type, a surface acoustic wave type, and so on. Capacitive touch screen works by using a current induction phenomenon of human body, supports multi-point touch, and has advantages of wear resistance, a long service life, and low power consumption, etc., so it has been developed rapidly and has been widely used in electronic products such as mobile phones, tablet computers, notebook computers, televisions, displays, digital photo frames, and navigators.

SUMMARY

The following is a summary of subject matters described herein in detail. The summary is not intended to limit the protection scope of claims.

An exemplary embodiment of the present disclosure provides a touch display substrate including a base substrate, and a touch lead layer, an anode conductive layer, and a cathode conductive layer disposed on the base substrate, wherein the anode conductive layer is located between the touch lead layer and the cathode conductive layer on a plane perpendicular to the base substrate, the anode conductive layer includes a plurality of transfer connection electrodes, the touch lead layer includes a plurality of touch leads, and the cathode conductive layer includes a plurality of cathodes.

The plurality of cathodes are multiplexed as a plurality of touch electrodes, the plurality of touch electrodes are electrically connected with the plurality of touch leads through the plurality of transfer connection electrodes, and at least part of the touch leads are located in a display region of the touch display substrate.

In an exemplary implementation mode, the anode conductive layer further includes a plurality of dummy electrodes, the plurality of dummy electrodes and the plurality of transfer connection electrodes form an electrode array arranged in rows and columns.

In an exemplary implementation mode, the plurality of touch electrodes are arranged in an array, orthographic projections of the plurality of dummy electrodes and the plurality of transfer connection electrodes on the base substrate are within a range of orthographic projections of the plurality of touch electrodes on the base substrate, and the electrode array includes a plurality of electrode sub-arrays corresponding to the plurality of touch electrodes.

In an exemplary implementation mode, a pixel definition layer is disposed between the anode conductive layer and the cathode conductive layer, the pixel definition layer is provided with a plurality of first transfer vias, and the plurality of touch electrodes are electrically connected with the plurality of transfer connection electrodes through the plurality of first transfer vias. A planarization layer is disposed between the touch lead layer and the anode conductive layer, and a plurality of second transfer vias are disposed on the planarization layer, and the plurality of transfer connection electrodes are electrically connected with the plurality of touch leads through the plurality of second transfer vias.

In an exemplary implementation mode, the pixel definition layer is further provided with a plurality of first dummy vias, orthographic projections of the plurality of first dummy vias on the base substrate are respectively within a range of orthographic projections of the plurality of dummy electrodes on the base substrate. Orthographic projections of the plurality of first transfer vias on the base substrate are respectively within a range of orthographic projections of a corresponding plurality of transfer connection electrodes on the base substrate.

In an exemplary implementation mode, the plurality of first dummy vias and the plurality of first transfer vias form a first via array arranged in rows and columns, the first via array includes a plurality of first via sub-arrays respectively corresponding to the plurality of touch electrodes, and arrangement modes of vias in the plurality of first via sub-arrays are consistent.

In an exemplary implementation mode, on a plane parallel to the display substrate, a first transfer via has an aperture size of 20 microns to 40 microns along a column direction, and the first transfer via has an aperture size of 40 microns to 80 microns along a row direction.

In an exemplary implementation mode, the planarization layer is further provided with a plurality of second dummy vias, orthographic projections of the plurality of second dummy vias on the base substrate are respectively within a range of orthographic projections of the plurality of dummy electrodes on the base substrate. Orthographic projections of the plurality of second transfer vias on the base substrate are respectively within a range of orthographic projections of the plurality of transfer connection electrodes on the base substrate.

In an exemplary implementation mode, the plurality of second dummy vias and the plurality of second transfer vias form a second via array arranged in rows and columns, the second via array includes a plurality of second via sub-arrays respectively corresponding to the plurality of touch electrodes, and arrangement modes of vias in the plurality of second via sub-arrays are consistent.

In an exemplary implementation mode, one cathode is electrically connected with at least one touch lead, one touch lead is electrically connected with one of the cathodes, and second supply voltages received by cathodes located in different rows from corresponding touch leads are different.

In an exemplary implementation mode, the touch display substrate includes the display region and a bonding region located on one side of the display region, and in a direction from the bonding region to the display region, absolute values of second power supply voltages received by a plurality of rows of cathodes from corresponding touch leads are sequentially incremented.

In an exemplary implementation mode, one cathode is electrically connected with a plurality of touch leads through a plurality of transfer connection electrodes, respectively; second power supply voltages received by a same cathode from a plurality of touch leads are the same; or, in the direction from the bonding region to the display region, transfer connection electrodes corresponding to a plurality of touch leads electrically connected with a same cathode are sequentially arranged, and absolute values of received second power supply voltages of a plurality of touch leads are sequentially incremented.

In an exemplary implementation mode, two adjacent touch electrodes located in a same row are misaligned in the column direction, to enable a gap between two adjacent columns of cathodes to be not in a straight line; two adjacent touch electrodes located in a same column are misaligned in the row direction, to enable a gap between two adjacent rows of cathodes to be not in a straight line.

In an exemplary implementation mode, a plurality of convex structures are disposed at edge positions of the cathodes in an irregular manner to enable a gap between two adjacent rows of cathodes and a gap between two adjacent columns of cathodes to be not in a straight line.

In an exemplary implementation mode, the touch display substrate includes the display region and a bonding region located on one side of the display region, the plurality of touch leads extend from the bonding region to the display region, and the plurality of touch leads penetrate through the display region in a direction from the bonding region to the display region.

In an exemplary implementation mode, the display region is provided with a plurality of pixel units arranged in an array, and any one of the pixel units corresponds to one dummy electrode or one transfer connection electrode.

In an exemplary implementation mode, the touch display substrate includes a drive circuit layer disposed on the base substrate, the drive circuit layer is located between the anode conductive layer and the base substrate, and the drive circuit layer includes one or more source-drain metal layers, one of the source-drain metal layers is multiplexed as the touch lead layer.

In an exemplary implementation mode, on a plane parallel to the touch display substrate, the plurality of touch leads extend along a second direction and are uniformly arranged along a first direction, and the first direction intersects with the second direction.

An exemplary embodiment of the present disclosure also provides a touch display apparatus, which includes the touch display substrate of any of the above embodiments.

An exemplary embodiment of the present disclosure also provides a drive method of a touch display substrate, which is applied to the touch display substrate of any of the above embodiments, wherein the touch display substrate includes a base substrate, and a touch lead layer, an anode conductive layer, and a cathode conductive layer disposed on the base substrate, wherein the anode conductive layer is located between the touch lead layer and the cathode conductive layer on a plane perpendicular to the base substrate, the anode conductive layer includes a plurality of transfer connection electrodes, the touch lead layer includes a plurality of touch leads, and the cathode conductive layer includes a plurality of cathodes arranged in an array; the plurality of cathodes are multiplexed as a plurality of touch electrodes, the plurality of touch electrodes are electrically connected with the plurality of touch leads through the plurality of transfer connection electrodes, at least part of the touch leads are located in a display region of the touch display substrate and extend to a bonding region located on one side of the display region; the method includes: providing different second power supply voltages to touch leads electrically connected with cathodes in different rows.

In an exemplary implementation mode, the providing different second supply voltages to touch leads electrically connected with cathodes in different rows, includes: sequentially incrementing absolute values of second power supply voltages provided to a plurality of rows of cathodes sequentially arranged in a direction from the bonding region to the display region through a plurality of touch leads.

In an exemplary implementation mode, one cathode is electrically connected with a plurality of touch leads through a plurality of transfer connection electrodes, respectively; second power supply voltages provided to a plurality of touch leads electrically connected with a same cathode are the same; or, absolute values of second power supply voltages provided to a plurality of touch leads electrically connected with a same cathode in the direction from the bonding region to the display region are sequentially incremented.

In an exemplary implementation mode, the method further includes: receiving a touch sensing signal from a touch lead; and providing a touch drive signal to a corresponding touch lead according to the touch sensing signal.

Other aspects may be comprehended upon reading and understanding drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with embodiments of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
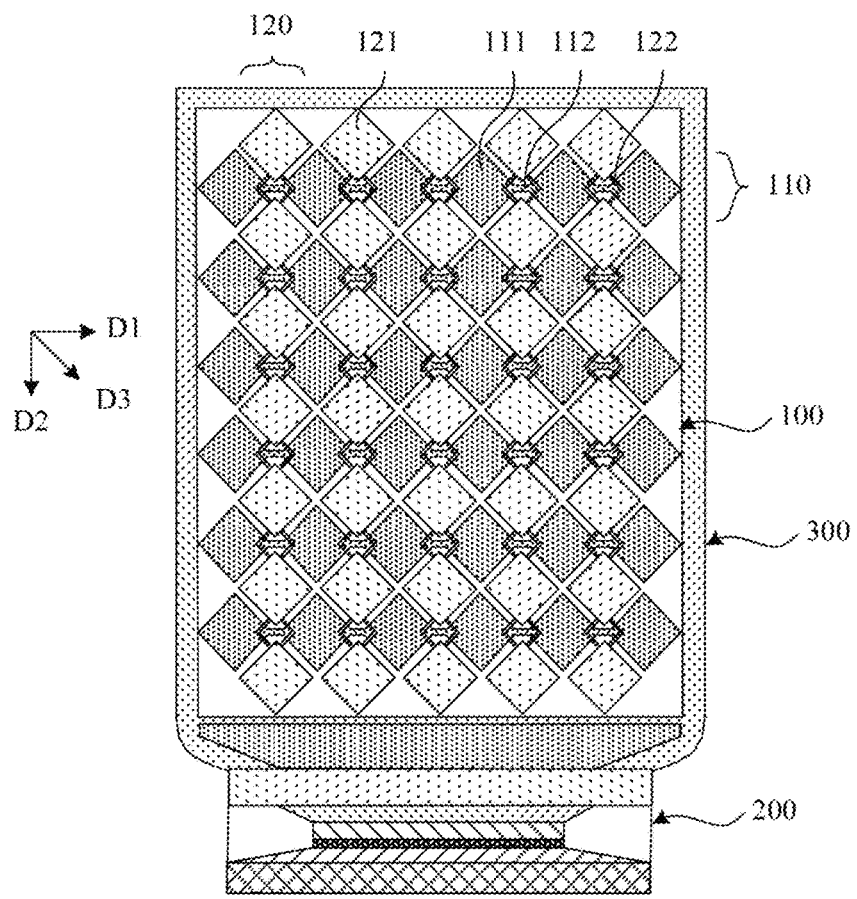
FIG. 1 is a schematic diagram of a planar structure of a touch display apparatus.

The embodiments of the present disclosure will be described in detail hereinafter in combination with the drawings. It is to be noted that implementation modes may be implemented in a plurality of different forms. Those of ordinary skills in the art may easily understand such a fact that modes and contents may be transformed into various forms without departing from the purpose and scope of the present disclosure. Therefore, the present disclosure should not be explained as being limited to contents recorded in following implementation modes only. The embodiments and features in the embodiments of the present disclosure may be randomly combined with each other if there is no conflict.

In the accompanying drawings, a size of each constituent element, a thickness of a layer, or a region may be exaggerated sometimes for clarity. Therefore, one mode of the present disclosure is not always limited to the size, and a shape and size of each component in the drawings do not reflect an actual scale. In addition, the accompanying drawings schematically illustrate ideal examples, and one mode of the present disclosure is not limited to shapes, numerical values, or the like shown in the drawings.

Ordinal numerals "first", "second", "third", etc., in the specification are set not to form limits in numbers but only to avoid confusion between constituent elements.

In the specification, for convenience, expressions "central", "above", "below", "front", "back", "vertical", "horizontal", "top", "bottom", "inside", "outside", etc., indicating orientations or positional relationships are used to illustrate positional relationships between the constituent elements with reference to the accompanying drawings, not to indicate or imply that a referred apparatus or element must have a specific orientation and be structured and operated with the specific orientation but only to easily and simply describe the specification, and thus should not be understood as limitations on the present disclosure. The positional relationships between the constituent elements may be changed as appropriate according to a direction according to which each constituent element is described. Therefore, appropriate replacements based on situations are allowed, which is not limited to the expressions in the specification.

In the specification, unless otherwise specified and defined, terms "mounting", "mutual connection", and "connection" should be understood in a broad sense. For example, a connection may be a fixed connection, or a detachable connection, or an integral connection; it may be a mechanical connection or an electrical connection; it may be a direct connection, or an indirect connection through middleware, or internal communication inside two elements. Those of ordinary skills in the art may understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region through which a current mainly flows.

In the specification, a first electrode may be a drain electrode, and a second electrode may be a source electrode. Or, the first electrode may be a source electrode, and the second electrode may be a drain electrode. In a case that transistors with opposite polarities are used, or in a case that a direction of a current changes during operation of a circuit, or the like, functions of the "source electrode" and the "drain electrode" are sometimes interchangeable. Therefore, the "source electrode" and the "drain electrode" are interchangeable in the specification.

In the specification, an "electrical connection" includes a case that constituent elements are connected together through an element with a certain electrical action. An "element with a certain electrical action" is not particularly limited as long as electrical signals between the connected constituent elements may be sent and received. Examples of the "element with the certain electrical action" not only include an electrode and a wiring, but also include a switching element such as a transistor, a resistor, an inductor, a capacitor, another element with various functions, etc.

In the specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is not defined so strictly and numerical values within ranges of process and measurement errors are allowed.

Structures of capacitive On Cell type touch panels are mainly divided into a mutual capacitance structure and a self-capacitance structure. The mutual capacitance structure refers to that a drive electrode and a sensing electrode are overlapped with each or approach to each other to form a mutual capacitance and position detection is performed by using a change of the mutual capacitance. The self-capacitance structure refers to forming a self-capacitance by a touch electrode and a human body and performing position detection by using a change of the self-capacitance. A self-capacitance touch panel has a single-layer structure, and has characteristics of low power consumption, and a simple structure, etc. A mutual capacitance touch panel has a multi-layer structure, and has characteristics of multi-point touch, etc.

In an exemplary implementation mode, a touch display apparatus may include a display substrate disposed on a base substrate and a touch panel disposed on the display substrate. The display substrate may be a Liquid Crystal Display (LCD) substrate, or an Organic Light Emitting Diode (OLED) display substrate, or a Plasma Display Panel (PDP) display substrate, or an Electrophoresis Display (EPD) substrate. In an exemplary implementation mode, the display substrate is an OLED display substrate. The OLED display substrate may include a base substrate, a drive circuit layer disposed on the base substrate, a light emitting structure layer disposed on the drive circuit layer, and an encapsulation layer disposed on the light emitting structure layer. The touch panel is disposed on the encapsulation layer of the display substrate, so as to form a Touch on Thin Film Encapsulation (Touch on TFE for short) structure. Integrating a display structure and a touch structure may achieve advantages of lightness and thinness, and foldability, etc., and meet product requirements of flexible folding, and a narrow bezel, etc.

At present, a Touch on TFE structure mainly includes a Flexible Multi Layer On Cell (FMLOC for short) structure and a Flexible Single Layer On Cell (FSLOC for short) structure. The FMLOC structure is based on a working principle of mutual capacitance detection. Generally, a drive (Tx) electrode and a sensing (Rx) electrode are formed by two layers of metal, and an Integrated Circuit (IC for short) achieves a touch action by detecting a mutual capacitance between the drive electrode and the sensing electrode. The FSLOC structure is based on a working principle of self-capacitance (or voltage) detection. Generally, a touch electrode is formed by a single layer of metal, and an integrated circuit achieves a touch action by detecting a self-capacitance (or voltage) of the touch electrode.

FIG. 1 is a schematic diagram of a planar structure of a touch display apparatus. A touch panel is disposed on a display panel to form an FMLOC structure. In a plane parallel to the touch panel, the touch panel includes an Active Area (AA), a bonding region located on one side of the active area, and an edge region located on another side of the active area. For the display panel and the touch panel which are stacked, the active area may be either a touch region of the touch panel or a display region of the display panel, and both the touch region and the display region in following description refer to the active area. In an exemplary implementation mode, a touch region 100 at least includes a plurality of touch electrodes arranged regularly, an edge region 300 at least includes a plurality of touch leads, and a bonding region 200 at least includes pins for connecting the touch leads to an external control apparatus.

In an exemplary implementation mode, the touch panel may have a mutual capacitance structure. The touch region 100 may include a plurality of first touch units 110 and a plurality of second touch units 120, wherein the first touch units 110 have a linear shape extending along a first direction D1 and the plurality of first touch units 110 are arranged in sequence along a second direction D2. A second touch unit 120 has a linear shape extending along the second direction D2 and the plurality of second touch units 120 are arranged in sequence along the first direction D1, wherein the first direction D1 intersects with the second direction D2. Each first touch unit 110 includes a plurality of first touch electrodes 111 and first connection portions 112 which are arranged in sequence along the first direction D1, and the first touch electrodes 111 and the first connection portion 112 are alternately disposed and sequentially connected. Each second touch unit 120 includes a plurality of second touch electrodes 121 arranged in sequence along the second direction D2, and the plurality of second touch electrodes 121 are disposed at intervals, wherein adjacent second touch electrodes 121 are connected with each other through a second connection portion 122. In an exemplary implementation mode, a film layer where the second connection portion 122 is located is different from a film layer where a first touch electrode 111 and a second touch electrode 121 are located. The first touch electrodes 111 and the second touch electrodes 121 are alternately disposed along a third direction D3, and the third direction D3 intersects with the first direction D1 and the second direction D2.

In an exemplary implementation mode, the plurality of first touch electrodes 111, the plurality of second touch electrodes 121, and the plurality of first connection portions 112 may be disposed in a same layer, i.e., a touch layer, and may be formed through a same patterning process, and a first touch electrode 111 and a first connection portion 112 may be of an interconnected integral structure. A second connection portion 122 may be disposed in a bridging layer, and adjacent second touch electrodes 121 are connected with each other through a via. An insulation layer is disposed between the touch layer and the bridging layer. In some possible implementation modes, the plurality of first touch electrodes 111, the plurality of second touch electrodes 121, and the plurality of second connection portions 122 may be disposed in a same layer, i.e., the touch layer, wherein a second touch electrode 121 and a second connection portion 122 may be of an interconnected integral structure. A first connection portion 112 may be disposed in the bridging layer and adjacent first touch electrodes 111 are connected with each other through a via. In an exemplary implementation mode, the first touch electrodes may be drive (Tx) electrodes and the second touch electrodes may be sensing (Rx) electrodes. Or, the first touch electrodes may be sensing (Rx) electrodes and the second touch electrodes may be drive (Tx) electrodes.

In an exemplary implementation mode, the first touch electrodes 111 and the second touch electrodes 121 may have a rhombic shape, for example, may be a regular rhombic shape, a rhombic shape with a longer transverse length, or a rhombic shape with a longer longitudinal length. In some possible implementation modes, the first touch electrodes 111 and the second touch electrodes 121 may have any one or more shapes of a triangle, a square, a trapezoid, a parallelogram, a pentagon, a hexagon, and other polygons, which are not limited in the present disclosure.

In an exemplary implementation mode, the first touch electrodes 111 and the second touch electrodes 121 may be in a form of a transparent conductive electrode. In another exemplary implementation mode, the first touch electrodes 111 and the second touch electrodes 121 may be in a form of a metal mesh. The metal mesh is formed by interweaving a plurality of metal lines and includes a plurality of mesh patterns, wherein the mesh patterns are polygons formed by the plurality of metal lines. The first touch electrodes 111 and the second touch electrodes 121 in the form of the metal mesh have advantages of a small resistance, a small thickness, a fast response speed, and the like.

Figure 2:
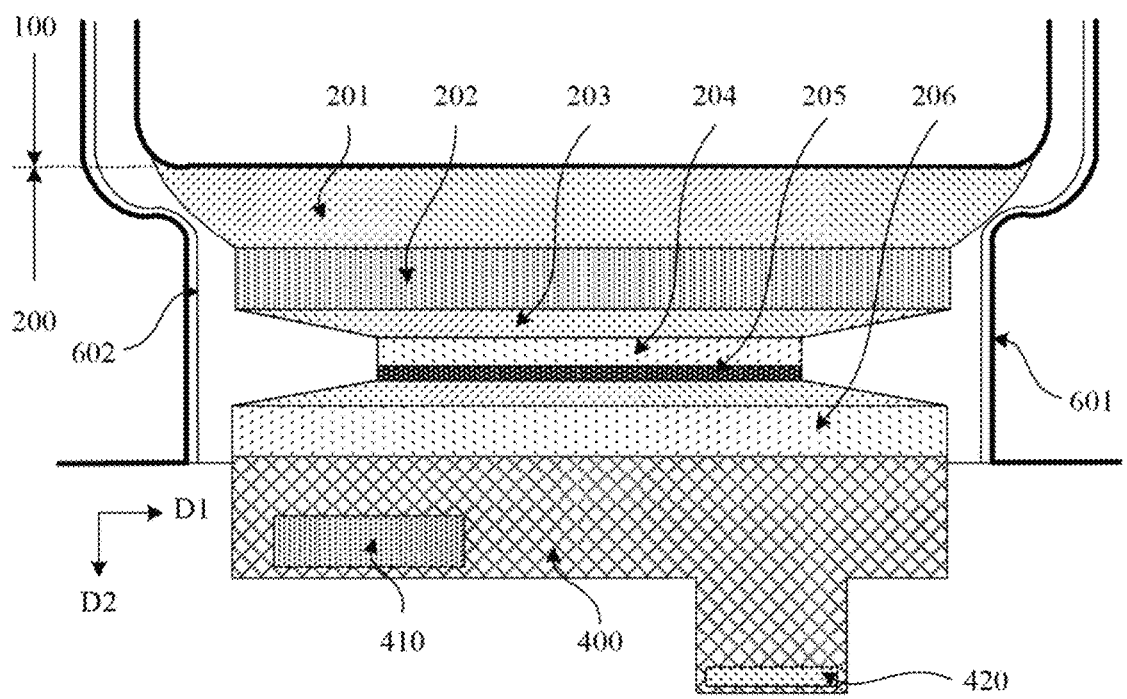
FIG. 2 is a schematic structural diagram of a bonding region.

FIG. 2 is a schematic structural diagram of a bonding region. As shown in FIG. 2, in an exemplary implementation mode, the bonding region 200 is located on a side of the touch region 100, and along a direction away from the touch region 100 (the second direction D2), the bonding region 200 may include a first fan-out region 201, a bending region 202, a second fan-out region 203, an antistatic region 204, a drive chip region 205, and a bonding pin region 206 which are disposed in sequence. The first fan-out region 201 may be provided with a signal transmission line of the display panel and a touch lead of the touch panel. The signal transmission line of the display panel at least includes a first power supply line (VDD), a second power supply line (VSS), and a plurality of data transmission lines, wherein the plurality of data transmission lines are configured to be connected with data lines of the display region 100 in a fan-out routing manner, the first power supply line VDD and the second power supply line VSS are configured to be connected with a high-level power supply line and a low-level power supply line of the display panel respectively. The plurality of touch leads of the touch panel are configured to be correspondingly connected with a plurality of pins of the bonding pin region 206. The bending region 202 may be provided with a groove configured to make the second fan-out region 203, the antistatic region 204, the drive chip region 205, and the bonding pin region 206 be bent to a back of the touch region 100. The second fan-out region 203 may be provided with a plurality of touch leads and a plurality of data transmission lines which are led out in a fan-out routing manner.

An anti-static circuit may be disposed in the anti-static region 204. The anti-static circuit is configured to eliminate static electricity.

A source drive circuit (Driver IC) may be disposed in the drive chip region 205. The source drive circuit is configured to be connected with the plurality of data transmission lines in the second fan-out region 203. The bonding pin region 206 may be provided with a plurality of pins, the plurality of pins are correspondingly connected with a plurality of touch leads and a plurality of display signal lines of the source drive circuit, and the bonding pin region 206 is configured to be bonded and connected with a Flexible Printed Circuit board (FPC) 400.

In an exemplary implementation mode, the flexible printed circuit board 200 at least includes a Touch IC 410 and a connector 420, wherein a plurality of touch leads are connected with the Touch IC 410, and a plurality of display signal lines are connected with the connector 420.

In an exemplary implementation mode, an outside of the bonding region 200 is further provided with a first cutting line 601 and a second cutting line 602, the second cutting line 602 is a fine cutting line which is located at a periphery of the bonding region 200 and a shape of the second cutting line 602 is the same as an outline of the bonding region 200. The first cutting line 601 is a rough cutting line which is located at a periphery of the second cutting line 602 and a shape of the first cutting line 601 is the same as an outline of the second cutting line 602. After a film layer process is completed, a cutting device cuts along the first cutting line 601 (rough cutting line), and after a test is completed, the cutting device cuts along the second cutting line 602 (fine cutting line), so that the display panel and the touch panel are formed.

Figure 3:
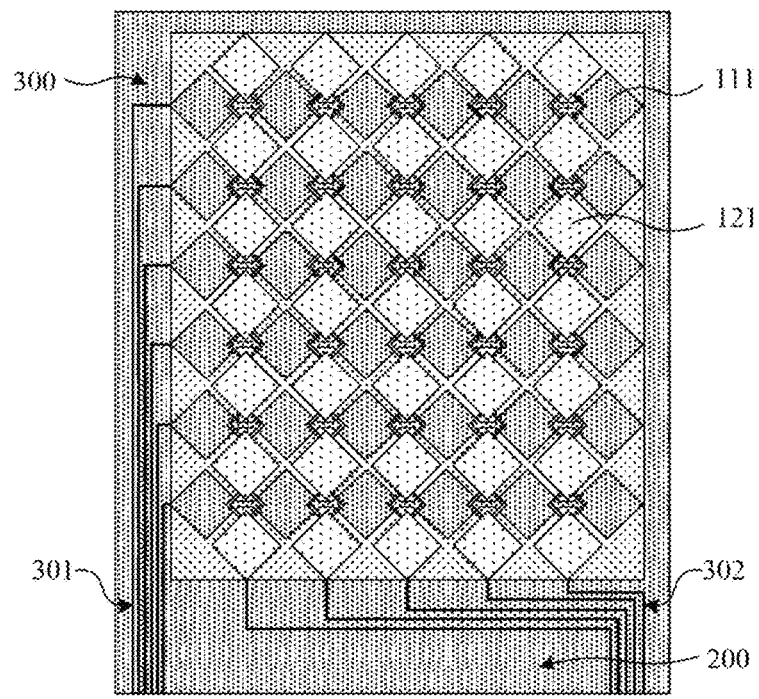
FIG. 3 is a schematic structural diagram of an edge region.

FIG. 3 is a schematic structural diagram of an edge region. As shown in FIG. 3, in an exemplary implementation mode, the edge region 300 is located on another side of the touch region 100 except a side where the bonding region 200 is located. In an exemplary implementation mode, a first touch electrode 111 is a sensing (Rx) electrode, and a second touch electrode 121 is a drive (Tx) electrode. In an exemplary implementation mode, the edge region 300 is provided with a plurality of sensing (Rx) leads 301 and a plurality of drive (Tx) leads 302. A first end of a drive lead 302 is connected with a drive electrode, and a second end of the drive lead 302 extends to one side of the bonding region 200. A first end of the sensing lead 301 is connected with a sensing electrode, and a second end of the sensing lead 301 extends along the edge region 300 to the other side of the bonding region 200. In an exemplary implementation mode, the sensing lead 301 together with the drive lead 302 constitutes a touch lead.

Figure 4:
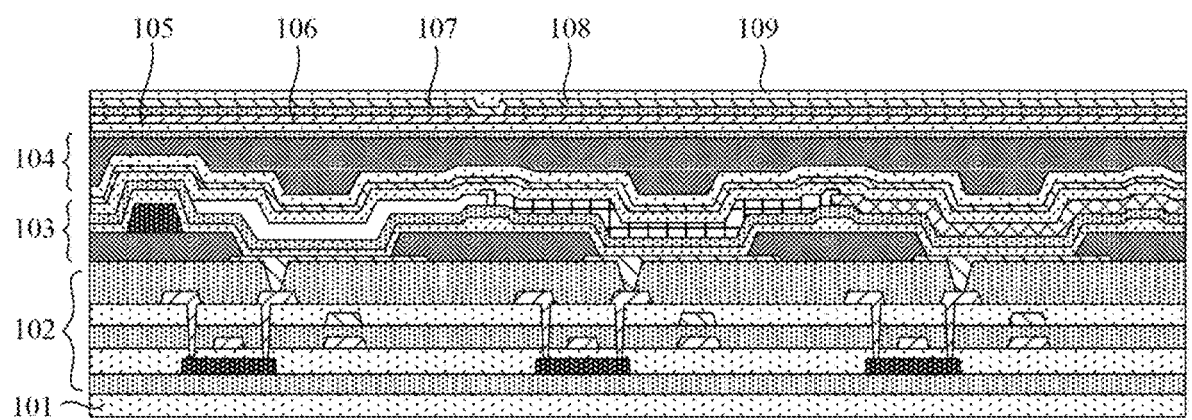
FIG. 4 is a schematic diagram of a cross-sectional structure of a touch display apparatus.

FIG. 4 is a schematic diagram of a cross-sectional structure of a touch display apparatus, illustrating a structure of three sub-pixels. As shown in FIG. 4, a touch panel is disposed on a display panel. In an exemplary implementation mode, on a plane perpendicular to the display panel, the display panel may include a drive circuit layer 102 disposed on a base substrate 101, a light emitting device 103 disposed on a side of the drive circuit layer 102 away from the base substrate 101, and an encapsulation layer 104 disposed on a side of the light emitting device 103 away from the base substrate 101. In some possible implementation modes, the display panel may include another film layer, such as a post spacer, which is not limited here in the present disclosure.

In an exemplary implementation mode, the base substrate may be a flexible base substrate, or a rigid base substrate. The flexible base substrate may include a first flexible material layer, a first inorganic material layer, a semiconductor layer, a second flexible material layer, and a second inorganic material layer which are stacked. Materials of the first flexible material layer and the second flexible material layer may be Polyimide (PI), Polyethylene Terephthalate (PET), or a surface-treated polymer soft film. Materials of the first inorganic material layer and the second inorganic material layer may be Silicon Nitride (SiNx) or Silicon Oxide (SiOx), for improving water and oxygen resistance of the base substrate, and a material of the semiconductor layer may be amorphous silicon (a-si).

In an exemplary implementation mode, the drive circuit layer 102 of each sub-pixel may include a plurality of transistors and a storage capacitor constituting a pixel drive circuit. FIG. 4 is illustrated by taking a case that each sub-pixel includes one drive transistor and one storage capacitor as an example. In some possible implementation modes, the drive circuit layer 102 of each sub-pixel may include: a first insulation layer disposed on a base substrate; an active layer disposed on the first insulation layer; a second insulation layer covering the active layer; a gate electrode and a first capacitance electrode disposed on the second insulation layer; a third insulation layer covering the gate electrode and the first capacitance electrode; a second capacitance electrode disposed on the third insulation layer; a fourth insulation layer covering the second capacitance electrode, wherein vias are disposed in the second insulation layer, the third insulation layer, and the fourth insulation layer, and the active layer is exposed by the vias; a source electrode and a drain electrode disposed on the fourth insulation layer, wherein the source electrode and the drain electrode are respectively connected with the active layer through vias; and a planarization layer covering the foregoing structures, wherein a via is disposed in the planarization layer, and the drain electrode is exposed by the via. The active layer, the gate electrode, the source electrode, and the drain electrode constitute a drive transistor, and the first capacitance electrode and the second capacitance electrode constitute the storage capacitor.

In an exemplary implementation mode, the light emitting device 103 may include an anode, a pixel definition layer, an organic emitting layer, and a cathode. The anode is disposed on the planarization layer, and is connected with the drain electrode of the drive transistor through the via disposed on the planarization layer; the pixel definition layer is disposed on the anode and the planarization layer, and a pixel opening is disposed on the pixel definition layer and exposes the anode; the organic emitting layer is at least partially disposed in the pixel opening, and the organic emitting layer is connected with the anode; the cathode is disposed on the organic emitting layer, and is connected with the organic emitting layer; and the organic emitting layer emits light of a corresponding color under drive of the anode and the cathode.

In an exemplary implementation mode, the encapsulation layer 104 may include a first encapsulation layer, a second encapsulation layer, and a third encapsulation layer that are stacked; the first encapsulation layer and the third encapsulation layer may be made of an inorganic material, and the second encapsulation layer may be made of an organic material; the second encapsulation layer is disposed between the first encapsulation layer and the third encapsulation layer to ensure that external water vapor cannot enter into the light emitting device 103.

In an exemplary implementation mode, an organic emitting layer of an OLED light emitting element may include an Emitting Layer (EML), and include one or more of a Hole Injection Layer (HIL), a Hole Transport Layer (HTL), a Hole Block Layer (HBL), an Electron Block Layer (EBL), an Electron Injection Layer (EIL), and an Electron Transport Layer (ETL). Driven by a voltage between the anode and the cathode, light emitting properties of organic materials are utilized according to a required gray scale.

In an exemplary implementation mode, emitting layers of OLED light emitting elements with different colors are different. For example, a red light emitting element includes a red emitting layer, a green light emitting element includes a green emitting layer, and a blue light emitting element includes a blue emitting layer. In order to reduce a process difficulty and improve a yield, a common layer may be adopted for a hole injection layer and a hole transport layer located on a side of an emitting layer, and a common layer may be adopted for an electron injection layer and an electron transport layer located on the other side of the emitting layer. In an exemplary implementation mode, any one or more of the hole injection layer, the hole transport layer, the electron injection layer, and the electron transport layer may be prepared through a one-time process (one-time evaporation process or one-time inkjet printing process), while isolation is achieved through a formed film layer surface segment difference or through surface treatment or other means. For example, any one or more of hole injection layers, hole transport layers, electron injection layers, and electron transport layers corresponding to adjacent sub-pixels may be isolated. In an exemplary implementation mode, the organic emitting layer may be formed through evaporation using a Fine Metal Mask (FMM) or an open mask, or formed using an inkjet process.

In an exemplary implementation mode, on a plane perpendicular to the touch panel, the touch panel may include a buffer layer 105 disposed on a side of the encapsulation layer 104 away from the base substrate 101; a first metal mesh layer (TMA for short) 106 disposed on a side of the buffer layer 105 away from the base substrate 101; an insulation layer 107 disposed on a side of the first metal mesh layer 106 away from the base substrate 101; a second metal mesh (TMB for short) layer 108 disposed on a side of the insulation layer 107 away from the base substrate 101, and a protective layer 109 disposed on a side of the second metal mesh layer 108 away from the base substrate 101.

In an exemplary implementation mode, the buffer layer 105 and the insulation layer 107 may be made of any one or more of Silicon Oxide (SiOx), Silicon Nitride (SiNx), and Silicon Oxynitride (SiON), and may be a single layer, a multi-layer, or a composite layer. The first metal mesh layer 106 and the second metal mesh layer 108 may be made of metal materials, such as any one or more of Argentum (Ag), Copper (Cu), Aluminum (Al), Titanium (Ti), and Molybdenum (Mo), or alloy materials of the aforementioned metals, and the protective layer 109 may be made of an organic material.

In an exemplary implementation mode, the first metal mesh layer 106 may be referred to as a bridging layer, and the second metal mesh layer 108 may be referred to as a touch layer. A plurality of first touch electrodes, second touch electrodes, and first connection portions may be disposed in a same layer, i.e., the touch layer, and second connection portions may be disposed in the bridging layer, and adjacent second touch electrodes are connected with each other through a via.

At present, an integration degree of a display apparatus is getting higher and higher, and a touch display apparatus in which display and touch control are integrated on a panel has advantages such as a low cost and a small thickness, which has become a development trend. With increase of an integration degree, a touch display apparatus has some problems, such as a high production cost and a difficult design of a narrow bezel.

An exemplary embodiment of the present disclosure provides a touch display substrate which may include a base substrate, and a touch lead layer, an anode conductive layer, and a cathode conductive layer that are disposed on the base substrate, wherein on a plane perpendicular to the base substrate, the anode conductive layer is located between the touch lead layer and the cathode conductive layer, the anode conductive layer includes a plurality of transfer connection electrodes, the touch lead layer includes a plurality of touch leads, and the cathode conductive layer includes a plurality of cathodes.

The plurality of cathodes are multiplexed as a plurality of touch electrodes, the plurality of touch electrodes are electrically connected with the plurality of touch leads through the plurality of transfer connection electrodes, and at least part of the touch leads are located in a display region of the touch display substrate.

In the touch display substrate provided by the embodiment of the present disclosure, a plurality of cathodes are multiplexed as touch electrodes, the plurality of touch electrodes are electrically connected with a plurality of touch leads in the touch lead layer through a plurality of transfer connection electrodes in the anode conductive layer, and at least part of the touch leads are located in the display region of the touch display substrate, so that a plurality of touch leads and cathodes in the touch display substrate do not need to occupy a bezel, thus greatly reducing the bezel of the touch display substrate and reducing a difficulty of a bezel narrowing design of the touch display substrate.

In the embodiment of the present disclosure, by multiplexing a plurality of cathodes as a plurality of touch electrodes, a manufacturing process of the touch display substrate may be simplified, a quantity of mask plates may be reduced, a manufacturing efficiency of the touch display substrate may be improved, a manufacturing cost may be reduced, and the touch display substrate may be thinned.

Figure 5:
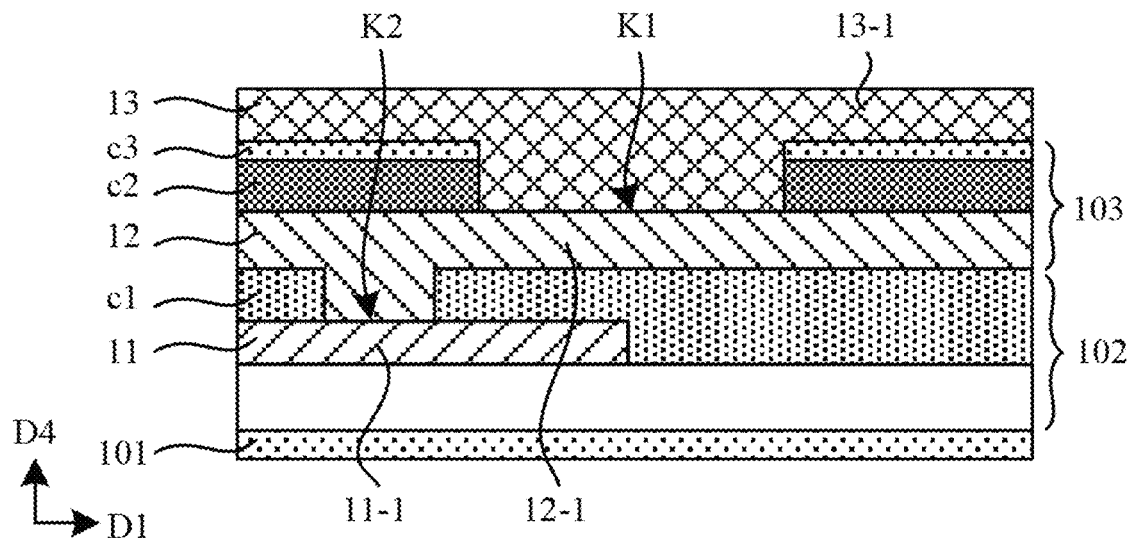
FIG. 5 is a schematic diagram of a cross-sectional structure of a touch display substrate provided by an embodiment of the present disclosure.

As shown in FIG. 5, the touch display substrate provided by the embodiment of the present disclosure may include a base substrate 101, and a touch lead layer 11, an anode conductive layer 12, and a cathode conductive layer 13 disposed on the base substrate 101. On a plane perpendicular to the base substrate 101 (i.e., a fourth direction D4 in FIG. 5), the anode conductive layer 12 is located between the touch lead layer 11 and the cathode conductive layer 13, the anode conductive layer 12 includes a plurality of transfer connection electrodes 12-1, the touch lead layer 11 includes a plurality of touch leads 11-1, and the cathode conductive layer 13 includes a plurality of cathodes 13-1; the plurality of cathodes 13-1 are multiplexed as a plurality of touch electrodes, and the plurality of touch electrodes 13-1 are electrically connected with a plurality of touch leads 11-1 through a plurality of transfer connection electrodes 12-1, and at least part of the touch leads 11-1 are located in a display region AA of the touch display substrate.

In an exemplary implementation mode, there is an overlapping region between an orthographic projection of a touch lead 11-1 on the base substrate 101 and orthographic projections of at least part of the cathodes 13-1 on the base substrate 101.

In an exemplary implementation mode, the display region AA may be a touch region or an active area of the touch display substrate.

In an exemplary implementation mode, as shown in FIG. 5, the touch display substrate may include a drive circuit layer 102 disposed on the base substrate 101, the drive circuit layer 105 is located between the anode conductive layer 12 and the base substrate 101, and the drive circuit layer 102 may include one or more source-drain metal layers, one of the source-drain metal layers is multiplexed as the touch lead layer 11.

In an exemplary implementation mode, the drive circuit layer 102 in the touch display substrate may include a first source-drain metal layer and a second source-drain metal layer located on a side of the first source-drain metal layer away from the base substrate 101, and the touch lead layer 11 in FIG. 5 may be the second source-drain metal layer; or, the drive circuit layer 102 in the touch display substrate may include a first source-drain metal layer, a second source-drain metal layer, and a third source-drain metal layer, the second source-drain metal layer is located between the first source-drain metal layer and the third source-drain metal layer, and the second source-drain metal layer is located on a side of the first source-drain metal layer away from the base substrate 101, then the touch lead layer 11 in FIG. 5 may be the third source-drain metal layer. That is, in a direction perpendicular to the base substrate 101, the touch lead layer 11 may be integrated in one conductive layer closest to the anode conductive layer 12 in the drive circuit layer 102.

A solution provided by the embodiment of the present disclosure may be called an In-cell Flexible Single Layer On Cell (In-cell FSLOC) structure, namely, a flexible single-layer covering surface structure in which the touch leads are integrated in the display substrate. As shown in FIG. 5, the touch display substrate may include a drive circuit layer 102 and a light emitting device layer 103, wherein the touch lead layer 11 may be integrated in one of the source-drain metal layers in the drive circuit layer 102, a transfer connection electrode 12-1 is integrated in the anode conductive layer 12 of the light emitting device layer 103, the touch lead 11-1 may be prepared through a one-time process with a pattern of a source-drain metal layer where the touch lead 11-1 is located, and the transfer connection electrode 12-1 and an anode in the anode conductive layer may be prepared through a one-time process. Compared with a Flexible Multi Layer On Cell (FMLOC) structure in the related art, the solution provided by the embodiment of the present disclosure may save four mask plates in a preparation process, thus saving at least four working procedures. In the FMLOC structure, in order to shield signal interference between the touch layer and a metal trace in the display panel, a cathode is usually disposed in one piece and extends to a bezel region, resulting in relatively large space occupied by the cathode in the bezel region, which is not conducive to a bezel narrowing design of the touch display substrate. In contrast, in the In-cell FSLOC structure provided by the embodiment of the present disclosure, a cathode is divided into a plurality and multiplexed as a plurality of touch electrodes, and the cathodes does not need to extend to a bezel region. On a premise that the touch electrodes and a metal trace in the display panel do not generate signal interference and touch control may be achieved, space occupied by the cathodes on a bezel is reduced, which is beneficial to a bezel narrowing design of the touch display substrate.

Figure 6:
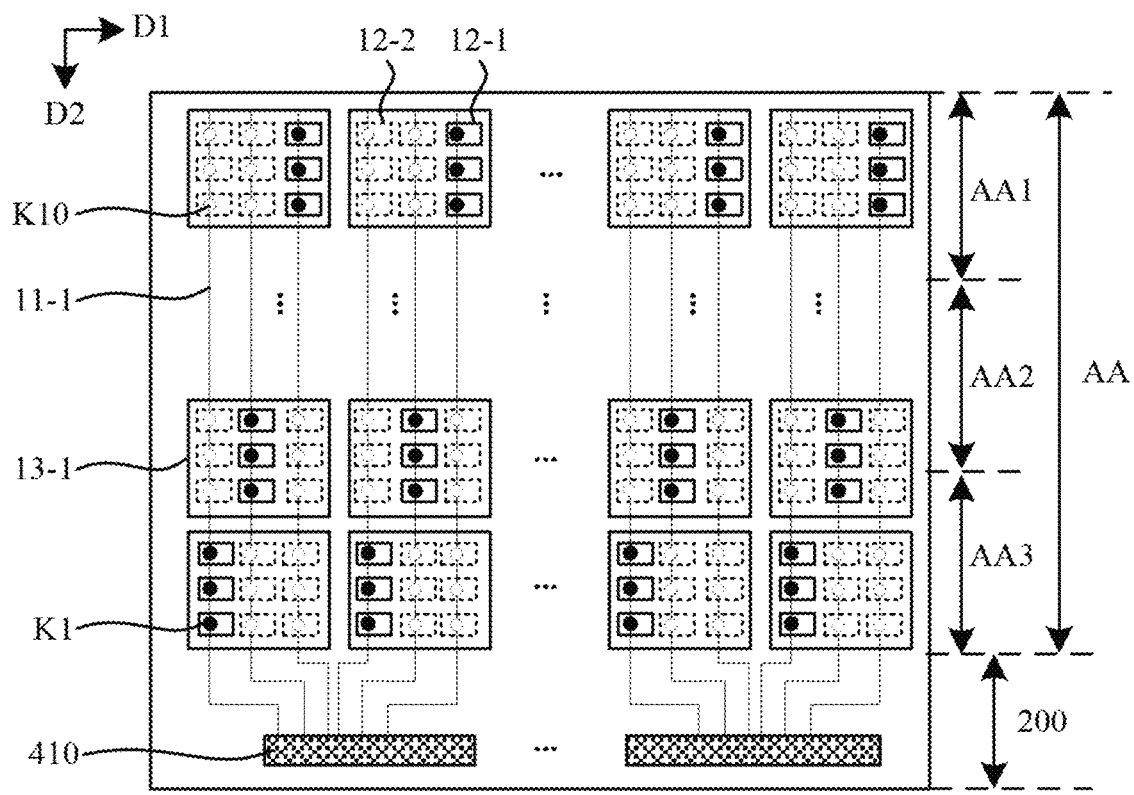
FIG. 6 is a schematic diagram of a planar structure of a touch display substrate provided by an exemplary embodiment of the present disclosure.

In an exemplary implementation mode, as shown in FIG. 6, the anode conductive layer 12 may further include a plurality of dummy electrodes 12-2, the plurality of dummy electrodes 12-2 and a plurality of transfer connection electrodes 12-1 form an electrode array arranged in rows and columns, and shapes and sizes of the plurality of dummy electrodes 12-2 may be consistent with the plurality of transfer connection electrodes 12-1. By disposing the dummy electrodes 12-2, a technical problem of display vanishing caused by inconsistent reflection of the anode conductive layer may be reduced, and visibility of the touch display substrate may be improved. In an exemplary implementation mode, a transfer connection electrode 12-1, a dummy electrode, and a plurality of anodes may be formed through a one-time patterning process. In an exemplary implementation mode, the plurality of dummy electrodes 12-2 are disposed as floating, i.e., there is no electrical connection between the plurality of dummy electrodes 12-2 and a plurality of touch leads 11-1. In an exemplary implementation mode, there is no electrical connection between the plurality of dummy electrodes 12-2 and a plurality of cathodes 13-1.

In an exemplary implementation mode, as shown in FIG. 6, the plurality of touch electrodes 13-1 are arranged in an array, orthographic projections of the plurality of dummy electrodes 12-2 and the plurality of transfer connection electrodes 12-1 on the base substrate 101 are within a range of orthographic projections of the plurality of touch electrodes 13-1 on the base substrate 101, the electrode array may include a plurality of electrode sub-arrays corresponding to the plurality of touch electrodes 13-1, and arrangement modes of electrodes in the plurality of electrode sub-arrays are consistent. Arrangement modes of electrodes (12-1 and 12-2) in a plurality of electrode sub-arrays corresponding to the plurality of touch electrodes 13-1 are consistent, so that reflection degrees of electrodes in the plurality of touch electrodes 13-1 in the touch display substrate are consistent, and a display effect of the touch display substrate is improved.

In an exemplary implementation mode, an orthographic projection of each touch lead 11-1 on the base substrate 101 may have an overlapping region with orthographic projections of a plurality of cathodes 13-1 in one column of cathodes on the base substrate 101.

Figure 7:
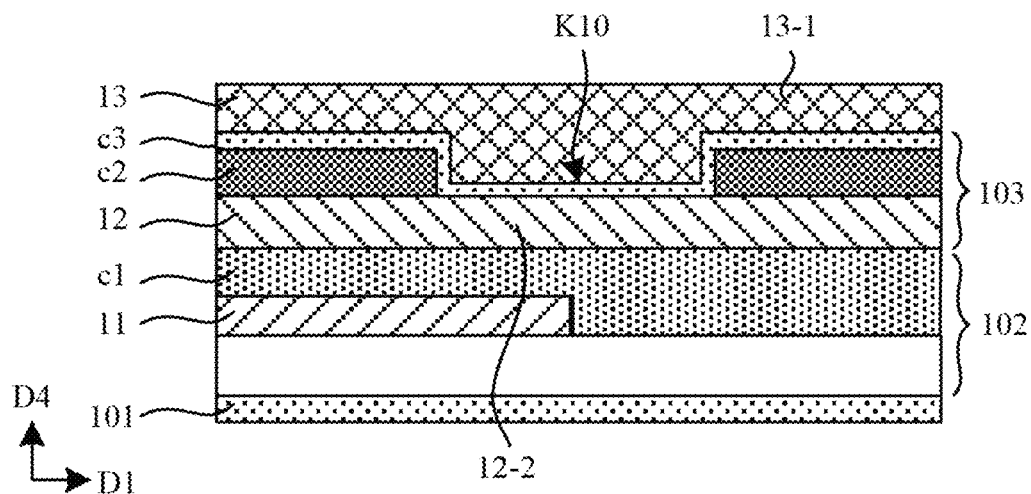
FIG. 7 is a schematic diagram of a cross-sectional structure of a touch display substrate provided by an exemplary embodiment of the present disclosure.

In an exemplary implementation mode, as shown in FIG. 5 to FIG. 7, a pixel definition layer c2 is disposed between the anode conductive layer 12 and the cathode conductive layer 13, the pixel definition layer c2 is provided with a plurality of first transfer vias K1, and a plurality of touch electrodes 13-1 are electrically connected with a plurality of transfer connection electrodes 12-1 through a plurality of first transfer vias K1; a planarization layer c1 is disposed between the touch lead layer 11 and the anode conductive layer 12, a plurality of second transfer vias K2 are disposed on the planarization layer c1, and a plurality of transfer connection electrodes 12-1 are electrically connected with a plurality of touch leads 11-1 through the plurality of second transfer vias K2.

In an exemplary implementation mode, an orthographic projection of a first transfer via K1 on the base substrate 101 is not overlapped with an orthographic projection of a second transfer via K2 on the base substrate 101.

In an exemplary implementation mode, as shown in FIG. 6, a same cathode 13-1 may be electrically connected with one of the touch leads 11-1 through a plurality of first transfer vias K1 and a plurality of transfer connection electrodes 12-1.

Figure 8:
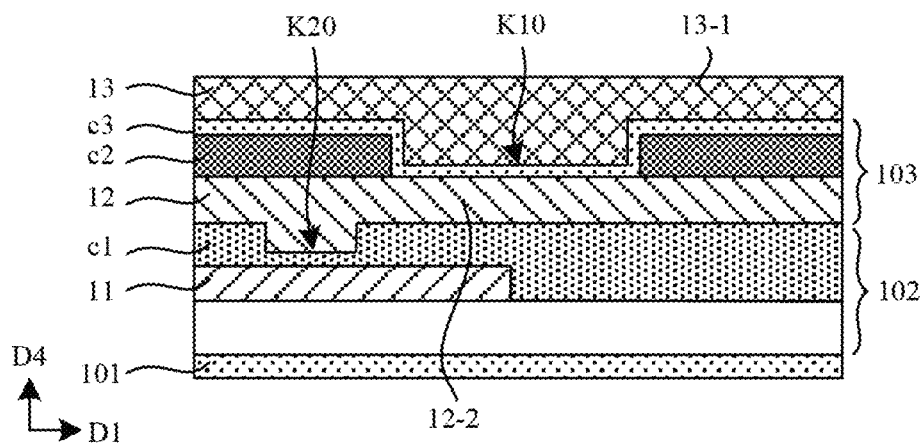
FIG. 8 is a schematic diagram of a cross-sectional structure of a touch display substrate provided by an exemplary embodiment of the present disclosure.

In an exemplary implementation mode, as shown in FIG. 6 to FIG. 8, the pixel definition layer c2 is further provided with a plurality of first dummy vias K10, orthographic projections of the plurality of first dummy vias K10 on the base substrate 101 are respectively within a range of orthographic projections of the plurality of dummy electrodes 12-2 on the base substrate 101; orthographic projections of the plurality of first transfer vias K1 on the base substrate 101 are respectively within a range of orthographic projections of a corresponding plurality of transfer connection electrodes 12-1 on the base substrate 101.

In an exemplary implementation mode, an emitting layer c3 is disposed between the pixel definition layer c2 and the cathode conductive layer 13. As shown in FIG. 7 and FIG. 8, the emitting layer c3 in the plurality of first dummy vias K10 may not be removed. As shown in FIG. 5, the emitting layer c3 in the plurality of first transfer vias K1 is removed, so that a transfer connection electrode 12-1 is electrically connected with a corresponding touch electrode 13-1.

In an exemplary implementation mode, as shown in FIG. 6, the plurality of first dummy vias K10 and the plurality of first transfer vias K1 form a first via array arranged in rows and columns, the first via array includes a plurality of first via sub-arrays respectively corresponding to the plurality of touch electrodes 13-1, and arrangement modes of vias in the plurality of first via sub-arrays are consistent so that vias in the touch display substrate are uniformly distributed and macroscopic defects of the vias are avoided.

In an exemplary implementation mode, as shown in FIG. 8, the planarization layer c1 may further be provided with a plurality of second dummy vias K20, orthographic projections of the plurality of second dummy vias K20 on the base substrate 101 are respectively within a range of orthographic projections of the plurality of dummy electrodes 12-2 on the base substrate 101; orthographic projections of the plurality of second transfer vias K2 on the base substrate 101 are respectively within a range of orthographic projection of the plurality of transfer connection electrodes 12-1 on the base substrate 101.

In an exemplary implementation mode, the plurality of second dummy vias K20 and the plurality of second transfer vias K2 may form a second via array arranged in rows and columns, the second via array includes a plurality of second via sub-arrays respectively corresponding to a plurality of touch electrodes 13-1, and arrangement modes of vias in the plurality of second via sub-arrays are consistent so that vias in the touch display substrate are uniformly distributed and macroscopic defects of the vias may be avoided.

In an exemplary implementation mode, as shown in FIG. 8, there is no overlapping region between orthographic projections of the plurality of second dummy vias K20 on the base substrate 101 and orthographic projections of the plurality of second transfer vias K2 on the base substrate 101; there is no overlapping region between orthographic projections of the plurality of first dummy vias K10 on the base substrate 101 and orthographic projections of the plurality of first transfer vias K1 on the base substrate 101.

In an exemplary implementation mode, as shown in FIG. 8, there is no overlapping region between orthographic projections of the plurality of second dummy vias K20 on the base substrate 101 and orthographic projections of the plurality of first dummy vias K10 on the base substrate 101.

In an exemplary implementation mode, as shown in FIG. 5 and FIG. 8, the plurality of second dummy vias K20 do not penetrate through the planarization layer c1; or, depths of the plurality of second dummy vias K20 are less than depths of the plurality of second transfer vias K2.

In an exemplary implementation mode, as shown in FIG. 5 and FIG. 8, widths of the plurality of second dummy vias K20 are smaller than widths of the plurality of first dummy vias K10. Designing a relatively small second dummy via K20 is beneficial to ensure flatness of a touch layer (i.e., the cathode conductive layer 13).

In an exemplary implementation mode, as shown in FIG. 6, one cathode 13-1 is electrically connected with at least one touch lead 11-1, one touch lead 11-1 is electrically connected with one of the cathodes 13-1, cathodes 13-1 located in different rows receive different second power supply voltages from corresponding touch leads 11-1, so as to independently control a plurality of touch electrodes 13-1.

In an exemplary implementation mode, as shown in FIG. 6, the touch display substrate may include a display region AA and a bonding region 200 located on a side of the display region AA. In a direction from the bonding region 200 to the display region AA (an opposite direction of a second direction D2 in FIG. 6), absolute values of second power supply voltages received by a plurality of rows of cathodes 13-1 from corresponding touch leads 11-1 are sequentially incremented.

In an exemplary implementation mode, as shown in FIG. 6, in the direction from the bonding region 200 to the display region AA (the opposite direction of the second direction D2 in FIG. 6), the absolute values of the second power supply voltages received by the plurality of rows of cathodes 13-1 from the corresponding touch leads 11-1 are sequentially incremented. A difference between absolute values of second supply voltage of adjacent regions (e.g., display regions AA1 and AA2) is about 0.0001 V to 0.5 V. A difference should not be too large. A too large amplitude difference will easily lead to an obvious brightness difference in normal display and poor display quality.

In an exemplary implementation mode, as shown in FIG. 6, the bonding region 200 may be provided with a Touch Chip (TIC) 410 and the Touch Drive Chip 410 may be the Touch Drive Circuit (Touch IC) 410 described above. In an exemplary implementation mode, as shown in FIG. 6, a plurality of touch chips 410 may be disposed according to a size of the touch display substrate to achieve drive of a plurality of touch electrodes 13-1. In an exemplary implementation mode, one end of the plurality of touch leads 11-1 is electrically connected with the touch drive circuit 410 in the bonding region 200, and the other end of the plurality of touch leads 11-1 extends along the direction from the bonding region 200 to the display region AA and is electrically connected with one of the touch electrodes 13-1. The touch drive circuit 410 may provide a second power supply voltage signal to a corresponding touch electrode 13-1 through a touch lead 11-1, receive a touch sensing signal from the corresponding touch electrode 13-1, and transmit a touch drive signal to the corresponding touch electrode 13-1.

In some embodiments, one end of the plurality of touch leads 11-1 is electrically connected with the touch drive circuit 410 in the bonding region 200, and the other end of the plurality of touch leads 11-1 extends along the direction from the bonding region 200 to the display region AA and is electrically connected with one of the touch electrodes 13-1. An orthographic projection of at least one of the touch leads 11-1 or orthographic projections of all of the touch leads 11-1 on the base substrate 101 are overlapped with orthographic projections of touch electrodes 13-1 in a same column direction on the base substrate 101, i.e., a touch lead 11-1 is electrically connected with the touch drive circuit 410 through a region where a touch electrode 13-1 is located, which does not occupy a peripheral region or a region between adjacent touch electrodes 13-1, thus facilitating achievement of a narrow bezel.

In the embodiment of the present disclosure, in the direction from the bonding region 200 to the display region AA, absolute values of second power supply voltages supplied by the touch drive circuit 410 to a plurality of rows of cathodes 13-1 through the touch leads 11-1 are sequentially incremented, so that a case that second power supply voltages received by the plurality of cathodes are different due to a voltage drop may be overcome, so that second power supply voltages supplied to a plurality of sub-pixels in a display substrate are as consistent as possible, which is beneficial to improving uniformity of a panel, avoiding poor display of the display substrate and ensuring a display effect of the display substrate.

Figure 9:
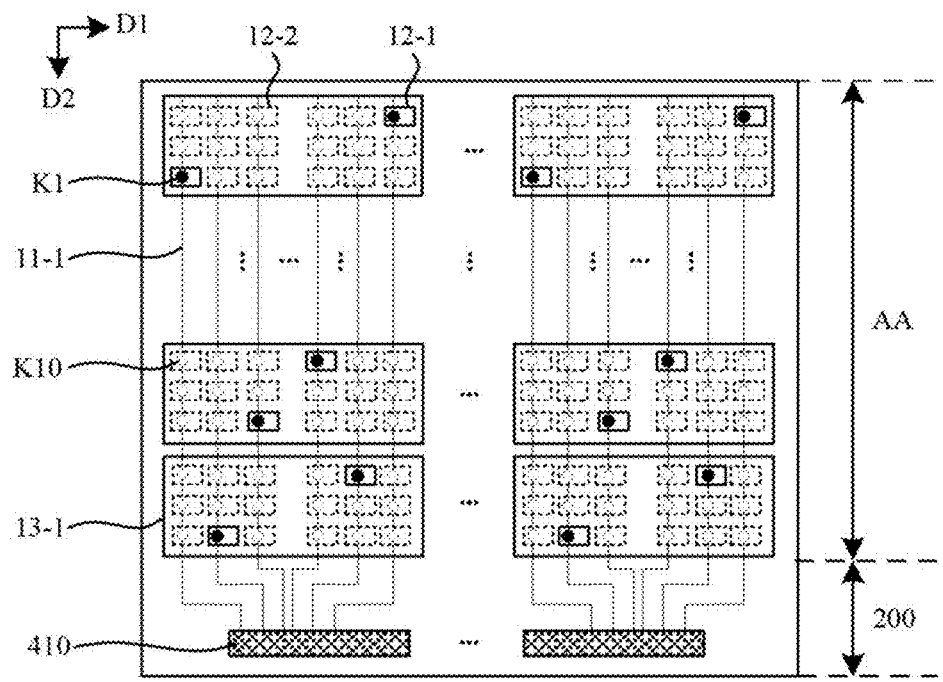
FIG. 9 is a schematic diagram of a planar structure of a touch display substrate provided by an exemplary embodiment of the present disclosure.

In an exemplary implementation mode, as shown in FIG. 6 and FIG. 9, one cathode 13-1 may be electrically connected with the plurality of touch leads 11-1 through the plurality of transfer connection electrodes 12-1, respectively. In structures shown in FIG. 6 and FIG. 9, second power supply voltages received by a same cathode 13-1 from a plurality of touch leads 11-1 may be the same. Or, in the structure shown in FIG. 9, in the direction from the bonding region 200 to the display region AA (the opposite direction of the second direction D2), transfer connection electrodes 12-1 corresponding to a plurality of touch leads 11-1 electrically connected with a same cathode 13-1 are arranged in sequence, and absolute values of the received second power supply voltages of the plurality of touch leads 11-1 are sequentially incremented, so as to avoid second power supply voltages supplied to a plurality of sub-pixels by a same cathode 13-1 are different due to the voltage drop, so that the second power supply voltages supplied to the plurality of sub-pixels in the display substrate are as consistent as possible, which is beneficial to improving uniformity of a panel, avoiding poor display of the display substrate and ensuring a display effect of the display substrate. A maximum value of absolute values of second power supply voltages received in a same cathode is not greater than a minimum value of absolute value of second power supply voltages received by a cathode located on a side of the cathode away from the bonding region 200. A minimum value of the absolute values of the second power supply voltages received in the same cathode is not lower than a maximum value of absolute values of second power supply voltages received by a cathode located between the cathode and the bonding region 200.

In the embodiment of the present disclosure, compared with a structure in which a cathode is an integrated piece in the related art, the cathode provided in the embodiment of the present disclosure is divided into a plurality of cathodes, each cathode may be independently controlled, and a second power supply voltage is provided for each cathode, thus reducing a current flowing through the cathode and a problem of poor display effect caused by a relatively large voltage drop of the cathode may be overcome.

In an exemplary implementation mode, as shown in FIG. 6 and FIG. 9, the plurality of touch leads 11-1 extend from the bonding region 200 to the display region AA, and in the direction from the bonding region 200 to the display region AA, the plurality of touch leads 11-1 penetrate through the display region AA. That is, the touch leads 11-1 extend from the bonding region 200 to the display region AA and penetrate through a side of the display region AA opposite to the bonding region 200, so that reflection intensities of the touch leads 11-1 in the touch display substrate may be consistent, a problem of display vanishing caused by inconsistent reflection of the touch leads 11-1 may be avoided, and visibility of the touch display substrate may be improved.

Figure 10A:
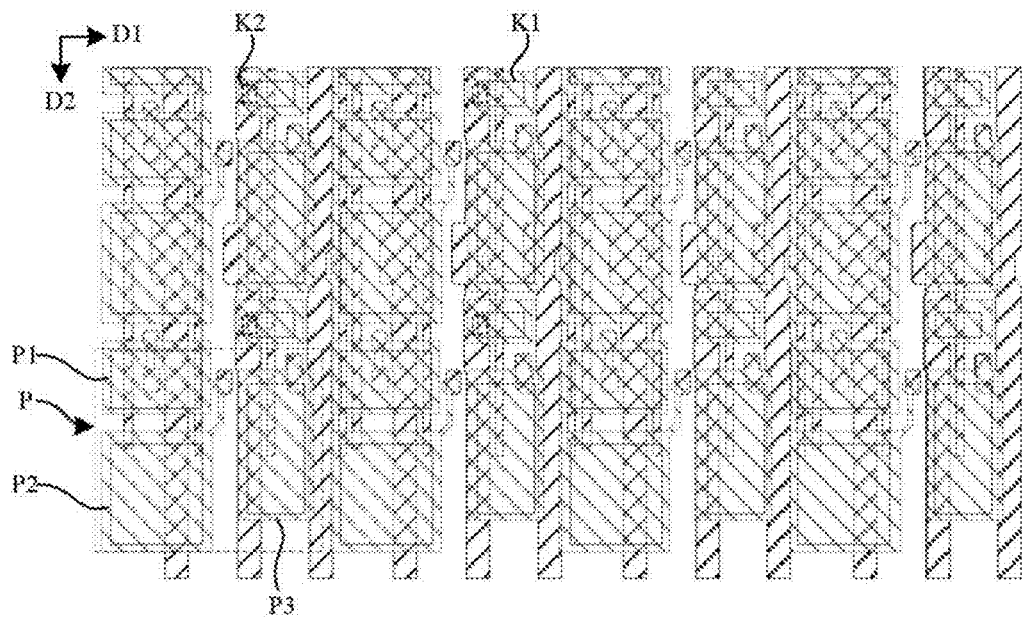
FIG. 10a is a schematic diagram of a planar structure of a touch display substrate provided by an exemplary embodiment of the present disclosure.

In an exemplary implementation mode, as shown in FIG. 10a, the display region AA is provided with a plurality of pixel units P arranged in an array, and any one of the pixel units P corresponds to one dummy electrode 12-2 or one transfer connection electrode 12-1, so that the electrodes of the plurality of pixel units reflect light consistently, thereby avoiding a problem of vanishing caused by inconsistent reflection, improving visibility of the touch display substrate and improving a display effect. As shown in FIG. 10, each pixel unit P may include at least three sub-pixels. In FIG. 10, taking a case that one pixel unit P may include three sub-pixels as an example, each pixel unit P may include a first sub-pixel P1, a second sub-pixel P2, and a third sub-pixel P3.

Figure 10B:
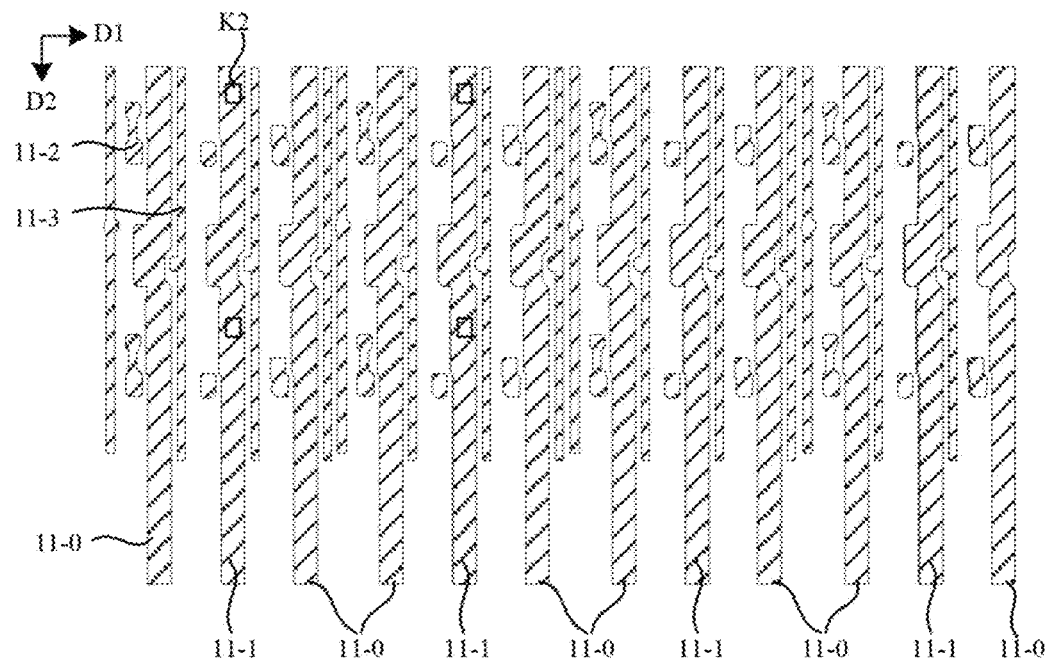
FIG. 10b is a schematic diagram of a planar structure of a touch lead layer in a touch display substrate provided by an exemplary embodiment of the present disclosure.
Figure 10C:
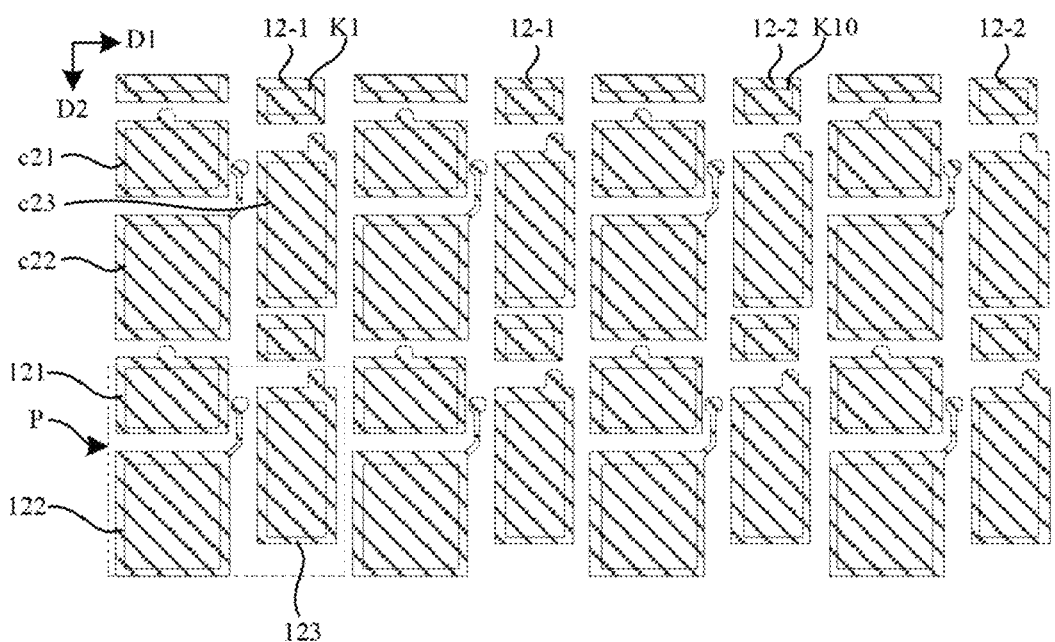
FIG. 10c is a schematic diagram of a planar structure of an anode conductive layer and a pixel definition layer in a touch display substrate provided by an exemplary embodiment of the present disclosure.

In an exemplary implementation mode, as shown in FIG. 10a to FIG. 10c, which are schematic diagrams of a structure in which a second source-drain metal layer in the drive circuit layer 102 is multiplexed as a touch lead layer. FIG. 10b is a schematic diagram of a planar structure of the touch lead layer 11. The touch lead layer 11 may include a first power supply connection line 11-0. In a plane parallel to the touch display substrate and in the first direction D1, two first power supply connection lines 11-0 are disposed between two adjacent touch leads 11-1, and a first power supply connection line 11-0 is configured to provide a first power supply voltage to a sub-pixel. FIG. 10c is a schematic diagram of a planar structure of an anode conductive layer and a pixel definition layer. In an exemplary implementation mode, the anode conductive layer may include a plurality of anodes, which may include a first anode 121 in a first sub-pixel P1, a second anode 122 in a second sub-pixel P2, and a third anode 123 in a third sub-pixel P3. The pixel definition layer may include a pixel opening, a plurality of pixel openings may include a first pixel opening c21 corresponding to the first sub-pixel P1, a second pixel opening c22 corresponding to the second sub-pixel P2, and a third pixel opening c23 corresponding to the third sub-pixel P13, an orthographic projection of each pixel opening on the base substrate is within a range of an orthographic projection of an anode of a corresponding sub-pixel on the base substrate. In an exemplary implementation mode, a plurality of transfer connection electrodes 12-1 and a plurality of dummy electrodes 12-2 may be disposed on the anode conductive layer 12, and a corresponding pixel definition layer c2 is provided with a first transfer via K1 and a first dummy via K10, orthographic projections of the plurality of first transfer vias K1 on the base substrate are respectively within a range of orthographic projections of the plurality of transfer connection electrodes 12-1 on the base substrate, and orthographic projections of the plurality of first dummy vias K10 on the base substrate are respectively within a range of orthographic projections of the plurality of dummy electrodes 12-2 on the base substrate. As shown in FIG. 10a and FIG. 10b, an orthographic projection of a second transfer via K2 disposed on the planarization layer c1 between the touch lead layer 11 and the anode conductive layer 12 on the base substrate may be partially overlapped with an orthographic projection of a first transfer via K1 on the base substrate, an orthographic projection of a second transfer via K2 on the base substrate is within a range of an orthographic projection of a corresponding touch lead 11-1 on the base substrate.

In an exemplary implementation mode, as shown in FIG. 10a and FIG. 10c, on a plane parallel to the touch display substrate, in the second direction D2, a first transfer via K1 and a first dummy via K10 may be disposed between two adjacent third sub-pixels P3, the first sub-pixel P1 and the second sub-pixel P2 are alternately arranged in the second direction D2, and the third sub-pixel P3 is alternately arranged with a transfer connection electrode 12-1 or a dummy electrode 12-2. In the first direction D1, the transfer connection electrode 12-1 and the dummy electrode 12-2 are located between two adjacent columns of first sub-pixels P1.

Figure 11A:
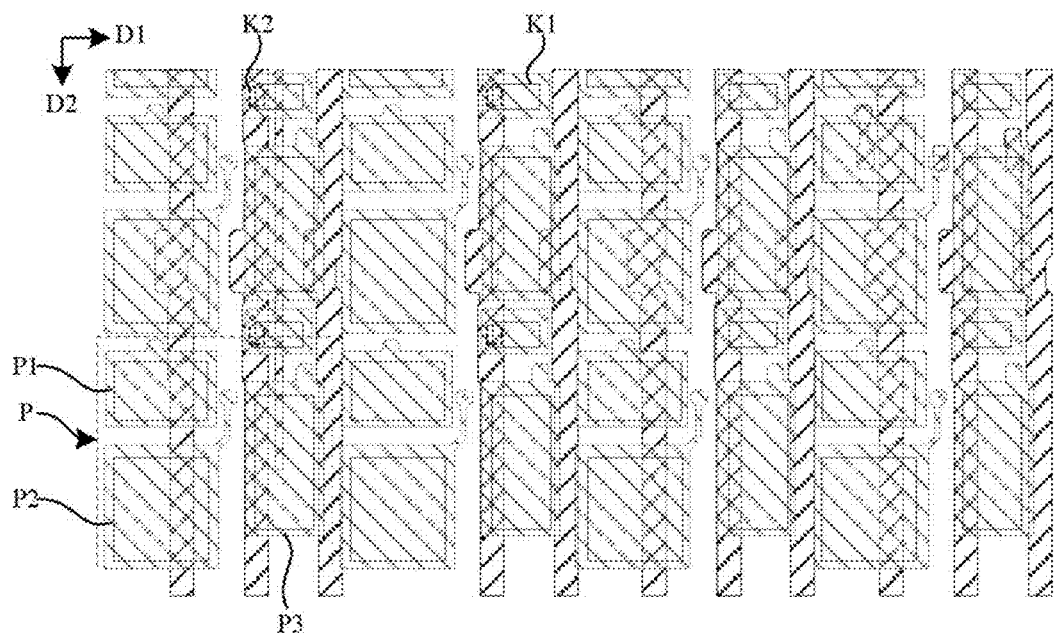
FIG. 11a is a schematic diagram of a planar structure of a touch display substrate provided by an exemplary embodiment of the present disclosure.
Figure 11B:
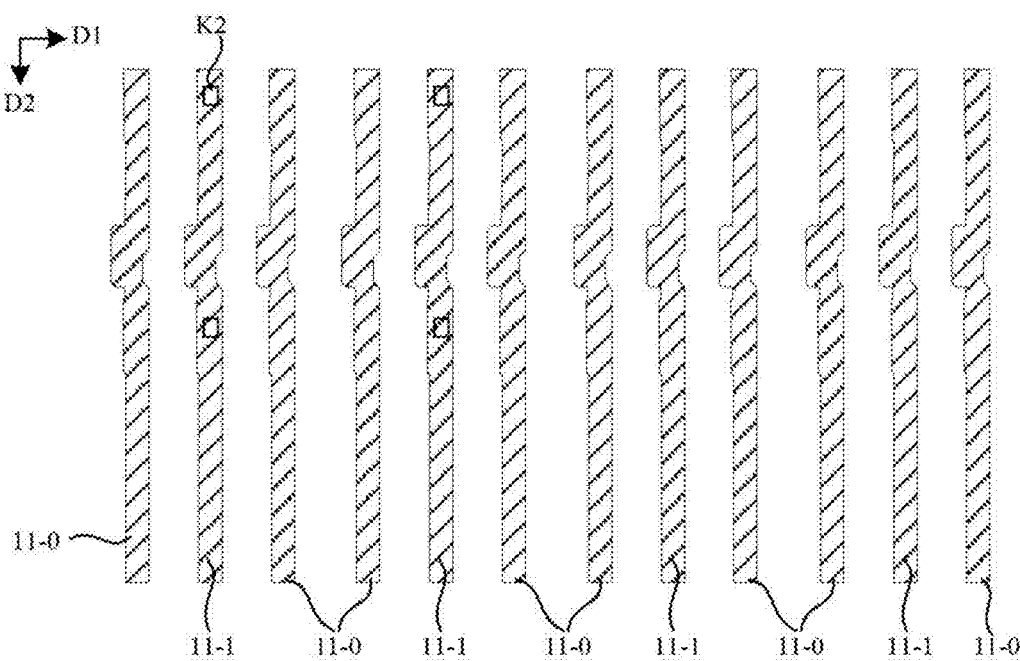
FIG. 11b is a schematic diagram of a planar structure of a touch lead layer in a touch display substrate provided by an exemplary embodiment of the present disclosure.

In an exemplary implementation mode, as shown in FIG. 11a to FIG. 11b, which are schematic diagrams of a structure in which a third source-drain metal layer in the drive circuit layer 102 is multiplexed as the touch lead layer 11, which is different from that in FIG. 10a to FIG. 10c in that an anode connection electrode 11-2 and a data signal line 11-3 are no longer disposed in the touch lead layer 11. In the structure where the third source-drain metal layer acts as the touch lead layer 11, only a first power supply connection line 11-0 and a touch lead 11-1 are disposed in the source-drain metal layer. In a plane parallel to the touch display substrate, two first power supply connection lines 11-0 are disposed between two adjacent touch leads 11-1 in the first direction D1, and a first power supply connection line 11-0 is disposed to provide a first power supply voltage to a sub-pixel. Structures of the anode conductive layer 12 and the pixel definition layer c2 are identical to those shown in FIG. 10a and FIG. 10c. In the embodiment of the present disclosure, the third source-drain metal layer is multiplexed as the touch lead layer 11, which may reduce a voltage drop of the first power supply connection line 11-0 and reduce power consumption of the touch display substrate under a condition of reducing a bezel. In addition, the FMLOC structure may be converted into an In-Cell FSLOC structure by utilizing the third source-drain metal layer in the present disclosure, which may simplify a conversion difficulty of a product. For example, the In-Cell FSLOC structure may be achieved by adding the third source-drain metal layer and the planarization layer on a basis of the FMLOC structure.

In planar structures shown in FIG. 11a and FIG. 10a, each pixel unit P may be correspondingly provided with one transfer connection electrode 12-1 or one dummy electrode 12-2, so that reflection of electrodes in a plurality of pixel units may be consistent, and a problem of display vanishing caused by inconsistent reflection of electrodes may be avoided, thereby improving visibility of the touch display substrate.

In the embodiment of the present disclosure, the first power supply connection line 11-0 may be electrically connected with the first power supply line VDD for receiving a first power supply voltage from the first power supply line VDD and providing the first power supply voltage to a plurality of sub-pixels in the display region AA.

In an exemplary implementation mode, as shown in FIG. 6 and FIG. 9, on a plane parallel to the touch display substrate, a plurality of touch leads 11-1 extend along the second direction D2 and are uniformly arranged along the first direction D1, the first direction D1 intersects with the second direction D2, and the plurality of touch leads 11-1 are uniformly arranged along the first direction D1, so that uneven display caused by uneven distribution of the plurality of touch leads 11-1 may be avoided and a display effect may be improved.

In an exemplary implementation mode, on a plane parallel to the display substrate, a first transfer via K1 has an aperture size of 20 microns to 40 microns in the second direction D2

(i.e., a column direction), and the first transfer via K1 has an aperture size of 40 microns to 80 microns in the first direction D1 (i.e., a row direction), i.e., an aperture size of the first transfer via K1 is 20 microns*40 microns to 40 microns*80 microns, so that a cathode 13-1 and a transfer connection electrode 12-1 may be well electrically connected. In an exemplary implementation mode, an aperture size of the first transfer via K1 along the second direction D2 is 20 microns to 40 microns, an aperture size of a first dummy via K10 along the first direction D2 is 40 microns to 80 microns, and the aperture size of the first dummy via K10 is consistent with the aperture size of the first transfer via K1, so that vias in the touch display substrate may be uniformly distributed and macroscopic defects of the vias may be avoided.

In an exemplary implementation mode, Table 1 is a test result of voltage drops of a touch electrode 11-1 in three display regions AA1, AA2, and AA3 arranged sequentially in the direction from the display region AA to the bonding region 200, a current distribution in the touch electrode 11-1 of the touch display substrate under brightness of 400 nits, voltage drops of a first power supply connection line 11-0, and power consumption and brightness Long Range Uniformity (LRU) of corresponding display regions in the structure shown in FIG. 6.

TABLE 1

| Position | Voltage drop (V) | | Current @ 400 nit | LRU |
| --- | --- | --- | --- | --- |
| | First power supply connection line 11-0 | Cathode 13-1 | | |
| AA1 | 0.00625 | 0.19221 | 0.237244 | 99.989% |
| AA2 | 0.00626 | 0.19222 | 0.237497 | 99.988% |
| AA3 | 0.00627 | 0.19223 | 0.237497 | 99.989% |

As may be seen from Table 1, by adopting the technical solution in which a cathode is divided into a plurality and multiplexed as a plurality of touch electrodes 13-1, provided by the embodiment of the present disclosure, voltage drops of the first power supply connection line 11-0 and the cathode 13-1 are very small, and voltage drops in the three display regions AA1, AA2, and AA3 are basically the same. Under brightness of 400 nits, currents of the touch display substrate in the three display regions AA1, AA2, and AA3 are basically the same, and an LRU value is relatively high. Therefore, it may be seen that the technical solution provided by the embodiment of the present disclosure has good display uniformity.

Figure 12A:
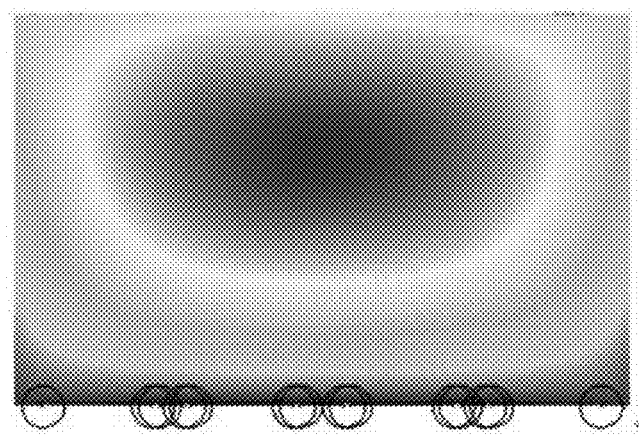
FIG. 12a is a simulation result diagram of Long Range Uniformity (LRU) of a touch display substrate.
Figure 12B:
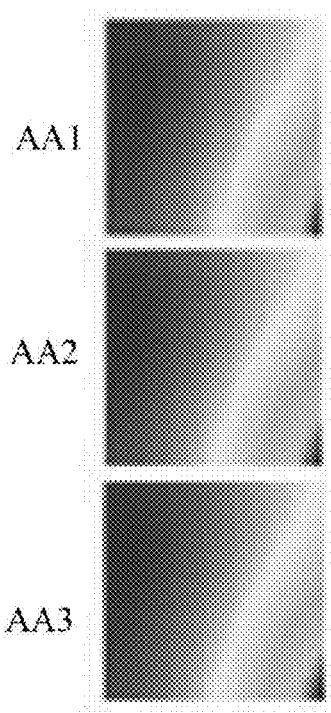
FIG. 12b is a simulation result diagram of LRU of a touch display substrate provided by an exemplary embodiment of the present disclosure.

As shown in FIG. 12a, in a case that a cathode is an integrated piece, a simulation result diagram of LRU shows that a simulation result of LRU is 84%. FIG. 12b is a simulation result diagram of LRU provided by the embodiment of the present disclosure when the cathode is divided into a plurality of cathodes arranged in an array and multiplexed as touch electrodes, and an LRU simulation result may reach 99%, so it may be seen that compared with a case that the cathode is of an integral structure, the solution provided by the embodiment of the present disclosure has better power consumption and long range uniformity of brightness in the display region.

The preparation process (method) of the touch display substrate in the embodiment of the present disclosure may be as shown in FIG. 13a to 13g, and may include following acts.

Act H1: Forming the Drive Circuit Layer 102 on the Base Substrate 101.

In an exemplary implementation mode, a part where a method of forming the drive circuit layer 102 is the same as that of the related art, will not be described in detail in the present disclosure. A part of forming the drive circuit layer 102 in the embodiment of the present disclosure is different from the related art in the source-drain metal layer multiplexed as the touch lead layer 11 and the planarization layer c1 located between the touch lead layer 11 and the anode conductive layer 12.

In an exemplary implementation mode, in a process of forming the source-drain metal layer multiplexed as the touch-lead layer 11 in the drive circuit layer 102, a touch lead 11-1 is newly added, and the touch lead 11-1 and an original conductive trace in the source-drain metal layer may be formed through a one-time patterning process.

Figure 13A:
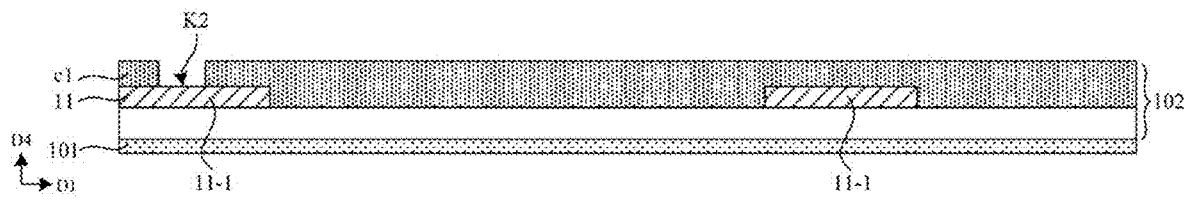
FIG. 13a is a schematic diagram of a cross-sectional structure after a drive circuit layer in a touch display substrate is formed provided by an exemplary embodiment of the present disclosure.

In an exemplary implementation mode, as shown in FIG. 13a, a plurality of second transfer vias K2 are added in a process of forming the planarization layer located between the touch lead layer 11 and the anode conductive layer 12. In an exemplary implementation mode, a plurality of second transfer vias K2 and at least a portion of other vias on the planarization layer may be formed through a one-time patterning process. The plurality of second transfer vias K2 expose surfaces of corresponding touch leads 11-1.

Act H2: Forming the Anode Conductive Layer 12 on a Side of the Drive Circuit Layer 102 Away from the Base Substrate 101.

Figure 13B:
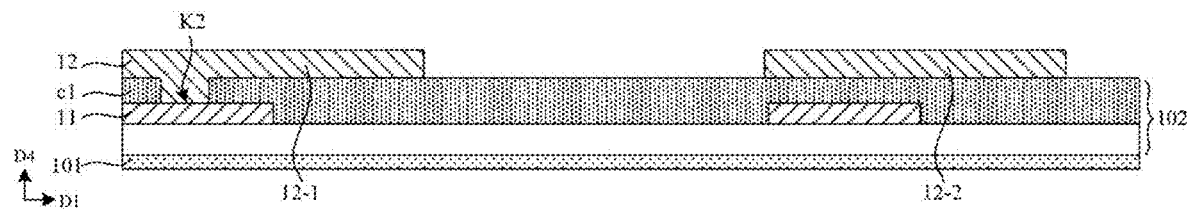
FIG. 13b is a schematic diagram of a cross-sectional structure after a drive circuit layer in a touch display substrate is formed provided by an exemplary embodiment of the present disclosure.

In an exemplary implementation mode, as shown in FIG. 13b, the anode conductive layer 12 may include a plurality of transfer connection electrodes 12-1, a plurality of dummy electrodes 12-2, and a plurality of anodes (121, 122, 123) as shown in FIG. 10c, and a schematic diagram of a planar structure of the plurality of transfer connection electrodes 12-1 and the plurality of anodes may be as shown in FIG. 10c.

Act H3: Forming the Pixel Definition Layer c2 on a Side of the Anode Conductive Layer 12 Away from the Base Substrate 101.

Figure 13C:
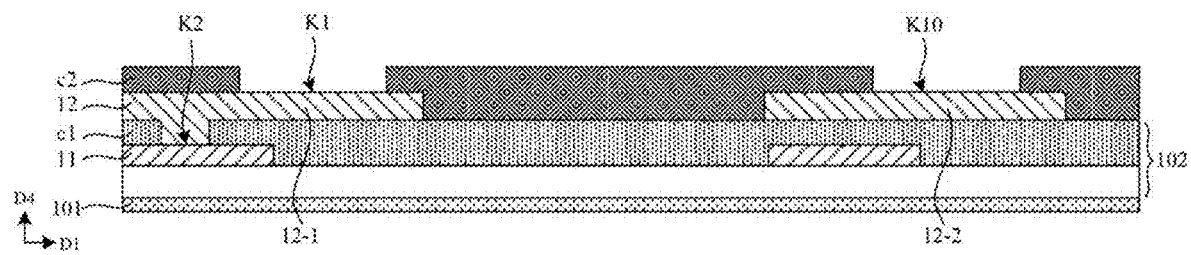
FIG. 13c is a schematic diagram of a cross-sectional structure after an anode conductive layer in a touch display substrate is formed provided by an exemplary embodiment of the present disclosure.

In an exemplary implementation mode, as shown in FIG. 13c, a first transfer via K1 and a first dummy via K10 are disposed on the pixel definition layer c2. The first transfer via K1 and the first dummy via K10 may be formed with a plurality of pixel openings (the first pixel opening c21, the second pixel opening c22, and the third pixel opening c23) on the pixel definition layer c2 through a one-time patterning process. A schematic diagram of a planar structure of the first transfer via K1, the first dummy via K10, and the pixel openings may be as shown in FIG. 10c.

Act H4: Forming the Emitting Layer c3 on a Side of the Pixel Definition Layer c2 Away from the Base Substrate 101.

Figure 13D:
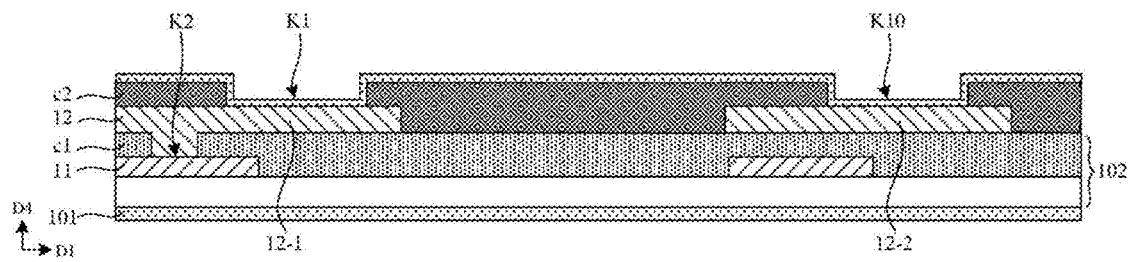
FIG. 13d is a schematic diagram of a cross-sectional structure after an emitting layer in a touch display substrate is formed provided by an exemplary embodiment of the present disclosure.

In an exemplary implementation mode, as shown in FIG. 13d, orthographic projections of the pixel openings, the first transfer via K1, and the first dummy via K10 on the base substrate 101 are within a range of an orthographic projection of the emitting layer c3 on the base substrate 101. In an exemplary implementation mode, the emitting layer c3 may be formed using an evaporation process.

Act H5: Removing the Emitting Layer c3 Located in the First Transfer Via K1.

Figure 13E:
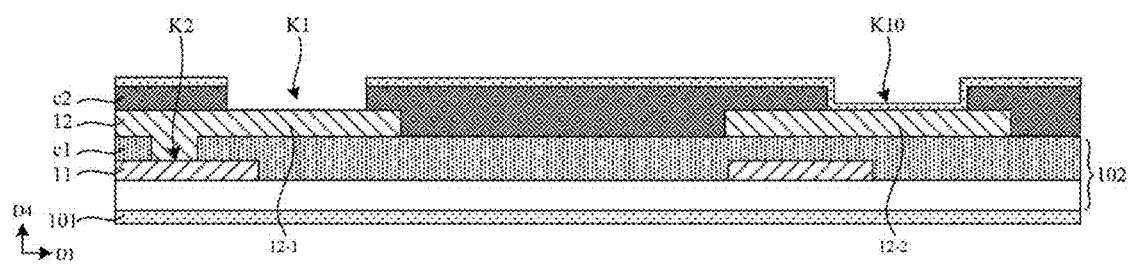
FIG. 13e is a schematic diagram of a cross-sectional structure of a touch display substrate after an emitting layer in a first transfer via is removed provided by an exemplary embodiment of the present disclosure.

In an exemplary implementation mode, as shown in FIG. 13e, the emitting layer c3 in the first transfer via K1 may be removed using a laser etching process to expose a surface of the transfer connection electrode 12-1. In the embodiment of the present disclosure, the emitting layer c3 located in the first dummy via K10 may be removed or retained.

Act H6: Forming the Cathode Conductive Layer 13 on a Side of the Emitting Layer c3 Away From the Base Substrate 101.

Figure 13F:
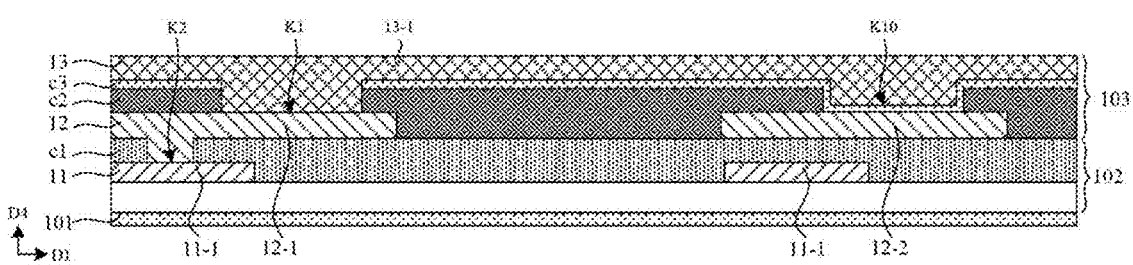
FIG. 13f is a schematic diagram of a cross-sectional structure after an anode conductive layer in a touch display substrate is formed provided by an exemplary embodiment of the present disclosure.

In an exemplary implementation mode, as shown in FIG. 13f, the cathode conductive layer 13 may be electrically connected with a touch lead 11-1 through a transfer connection electrode 12-1, thereby providing a second power supply voltage to a cathode 13-1 through the touch lead 11-1 and receiving or transmitting a corresponding touch signal.

Figure 13G:
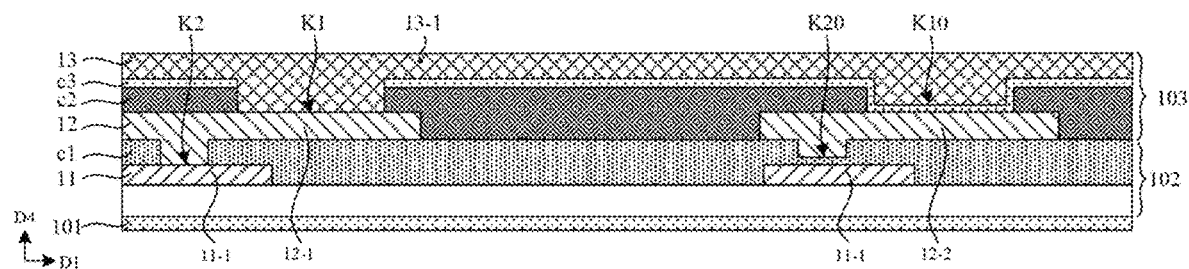
FIG. 13g is a schematic diagram of a cross-sectional structure after an anode conductive layer in a touch display substrate is formed provided by an exemplary embodiment of the present disclosure.

In an exemplary implementation mode, as shown in FIG. 13g, a plurality of second dummy vias K20 may be added in a process of forming the planarization layer c1 in the act H1, and orthographic projections of the plurality of second dummy vias K20 on the base substrate 101 are within a range of orthographic projections of corresponding touch leads 11-1 on the base substrate 101. In an exemplary implementation mode, the planarization layer in the plurality of second dummy vias K20 is partially removed, and surfaces of the corresponding touch leads 11-1 are not exposed, thus avoiding that a corresponding dummy electrode 12-2 and a touch lead 11-1 at a corresponding position are electrically connected. The plurality of second dummy vias K20 are disposed, so that vias in the touch display substrate may be uniformly distributed, and macroscopic defects of the vias may be avoided.

Figure 14A:
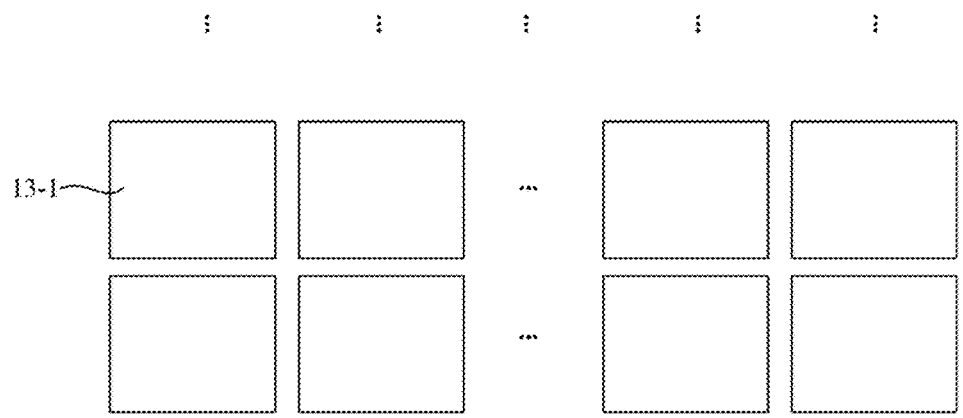
FIG. 14a is a schematic diagram of a planar structure of a cathode conductive layer in a touch display substrate provided by an exemplary embodiment of the present disclosure.
Figure 14B:
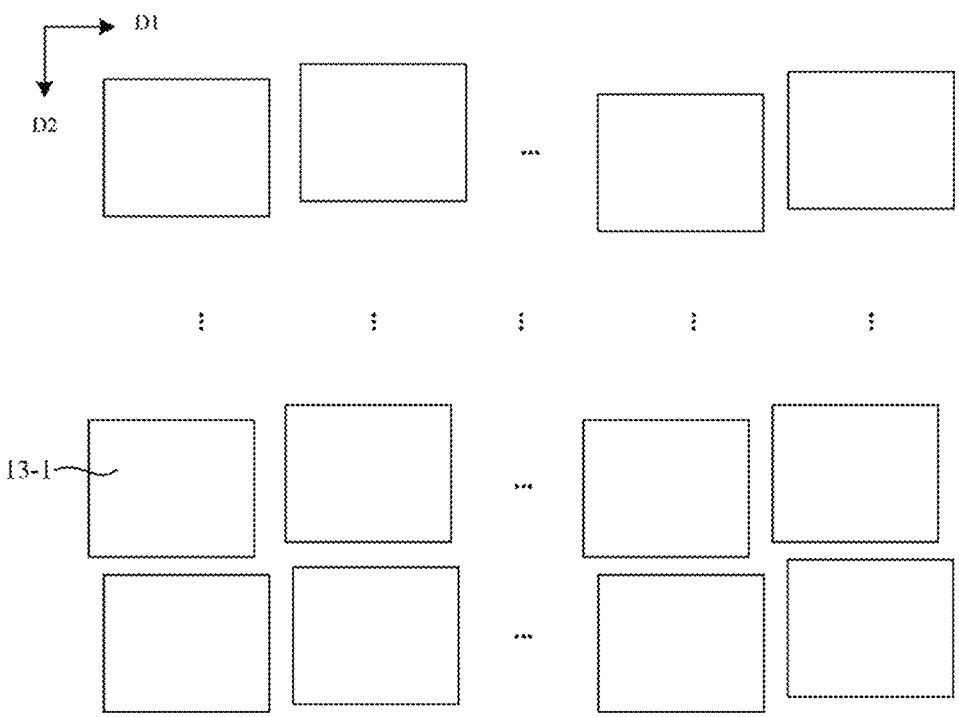
FIG. 14b is a schematic diagram of a planar structure of a cathode conductive layer in a touch display substrate provided by an exemplary embodiment of the present disclosure.
Figure 14C:
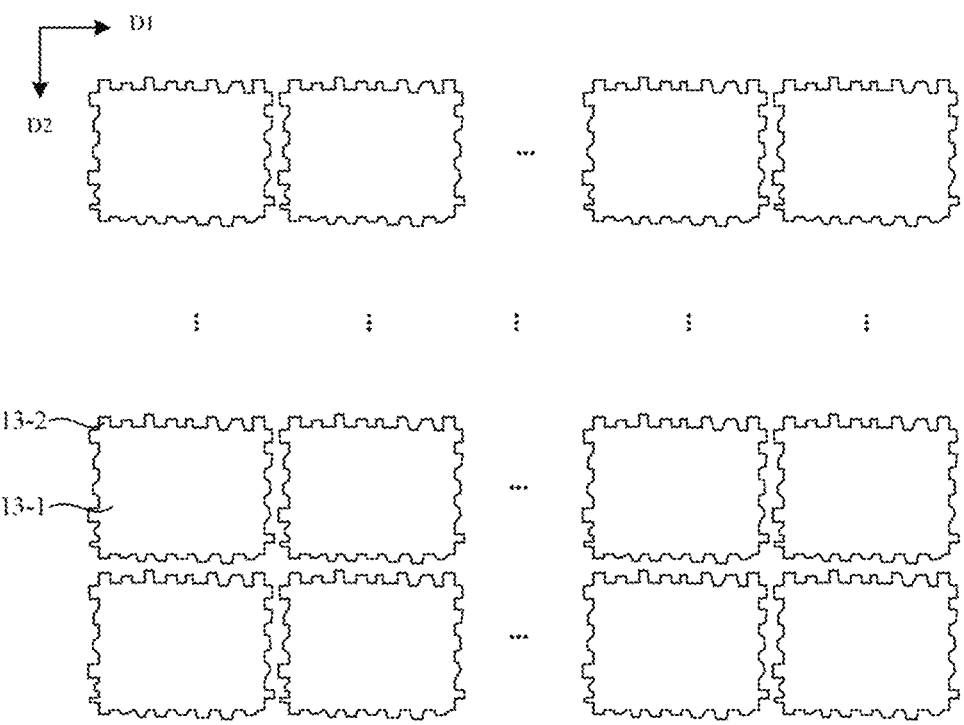
FIG. 14c is a schematic diagram of a planar structure of a cathode conductive layer in a touch display substrate provided by an exemplary embodiment of the present disclosure.

The cathode conductive layer 13 formed in the act H6 may be as shown in FIG. 14a to FIG. 14c. In FIG. 14a, a plurality of cathodes 13-1 are arranged in an array, and a gap between two adjacent rows and a gap between two adjacent columns in a structure shown in FIG. 14 are visually a straight line, which is easy to be observed.

In an exemplary implementation mode, in a structure shown in FIG. 14b, two adjacent cathodes 13-1 (i.e., touch electrodes 13-1) located in a same row are misaligned in the second direction D2 (i.e., column direction), so that a gap between two adjacent columns of cathodes 13-1 is not in a straight line, and two adjacent cathodes 13-1 located in a same column are misaligned in the first direction D1 (i.e., row direction), so that a gap between two adjacent rows of cathodes is not in a straight line, thus avoiding that a gap between two adjacent rows of cathodes and a gap between two adjacent columns of cathodes in a plurality of cathodes arranged in rows and columns are visually in a straight line, thereby improving a display effect of the touch display substrate.

In an exemplary implementation mode, in a structure shown in FIG. 14c, in a plurality of cathodes (touch electrodes 13-1) arranged in rows and columns, a plurality of convex structures 13-2 are disposed at an edge position of each cathode in an irregular manner, so that a gap between two adjacent rows of cathodes and a gap between two adjacent columns of cathodes are not in a straight line, avoiding that the gap between two adjacent rows of cathodes and the gap between two adjacent columns of cathodes are visually in a visible straight line, thereby improving a display effect of the touch display substrate.

Figure 14D:
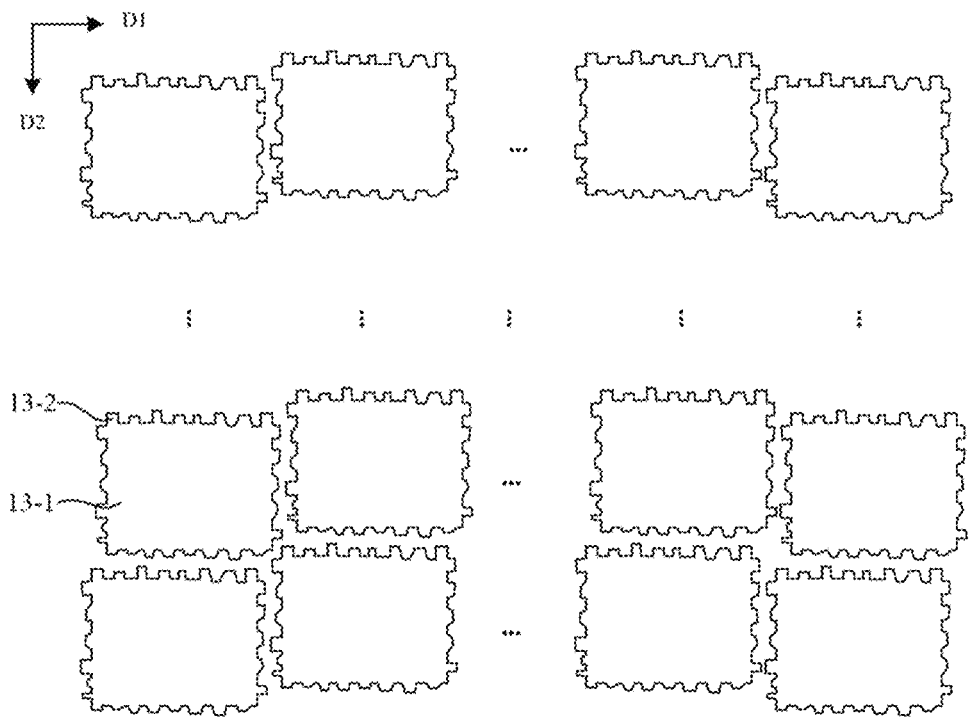
FIG. 14d is a schematic diagram of a planar structure of a cathode conductive layer in a touch display substrate provided by an exemplary embodiment of the present disclosure.

In an exemplary implementation mode, a cathode arrangement mode in the cathode conductive layer 13 may be as shown in FIG. 14d, two adjacent cathodes 13-1 located in a same row are misaligned in the second direction D2, two adjacent cathodes 13-1 located in a same column are misaligned in the first direction D1, and a plurality of convex structures 13-2 are disposed at an edge position of each cathode in an irregular manner, thereby avoiding that a gap between two adjacent rows of cathodes and a gap between two adjacent rows of cathodes are visually in a visible straight line, thereby improving visibility of cathodes and improving a display effect of the touch display substrate.

In misaligned arrangement modes shown in FIG. 14b and FIG. 14d, a plurality of cathodes 13-1 located in a same row are substantially in a same row, and a plurality of cathodes 13-2 located in a same column are substantially in a same column, and a misalignment size can avoid that a gap between two adjacent rows and a gap between two adjacent columns are visually a straight line. A size and shape of a convex structure 13-2 disposed in an irregular manner as shown in FIG. 14c and FIG. 14d, can make the gap between two adjacent rows and the gap between two adjacent columns not be a straight line visually. A shape of a cathode 13-1 after the convex structure 13-2 is disposed is consistent with that before the convex structure 13-2 is disposed (i.e., a main body structure of the cathode will not change). For example, if a shape of the cathode 13-1 is a rectangular structure, a shape of the cathode 13-1 after the convex structure 13-2 is disposed at the edge position is approximately a rectangle. In an exemplary implementation mode, a shape of the convex structure 13-2 may be one or more of a rectangle, a rounded corner, a triangle, a polygonal structure with a quantity of sides greater than 3, and the shape of the convex structure 13-2 may be an irregular shape, such as a polygon combination or an irregular polygon.

The present disclosure also provides a touch display apparatus, the touch display apparatus may include a touch display substrate described in any one of the above embodiments. In an exemplary implementation mode, the touch display apparatus may be any product or component with a display function, such as a mobile phone, a tablet computer, a television, a display, a laptop computer, a digital photo frame, and a navigator.

An embodiment of the present disclosure also provides a drive method of a touch display substrate, which is applied to the touch display substrate described in any of the above embodiments, wherein the touch display substrate includes a base substrate, and a touch lead layer, an anode conductive layer, and a cathode conductive layer disposed on the base substrate, wherein on a plane perpendicular to the base substrate, the anode conductive layer is located between the touch lead layer and the cathode conductive layer, the anode conductive layer includes a plurality of transfer connection electrodes, the touch lead layer includes a plurality of touch leads, and the cathode conductive layer includes a plurality of cathodes arranged in an array; the plurality of cathodes are multiplexed as a plurality of touch electrodes, the plurality of touch electrodes are electrically connected with the plurality of touch leads through the plurality of transfer connection electrodes, at least part of the touch leads are located in a display region of the touch display substrate and extend to a bonding region located on one side of the display region; the method includes: providing different second power supply voltages to touch leads electrically connected with cathodes in different rows.

In an exemplary implementation mode, the act of providing different second power supply voltages to touch leads electrically connected with cathodes in different rows may include: sequentially incrementing absolute values of second power supply voltages provided to a plurality of rows of cathodes sequentially arranged in a direction from the bonding region to the display region through a plurality of touch leads.

In an exemplary implementation mode, one cathode is electrically connected with a plurality of touch leads through a plurality of transfer connection electrodes, respectively; second power supply voltages provided to a plurality of touch leads electrically connected with a same cathode are the same; or, absolute values of second power supply voltages provided to a plurality of touch leads electrically connected with a same cathode in the direction from the bonding region to the display region are sequentially incremented.

In an exemplary implementation mode, the drive method of the touch display substrate may further include: receiving a touch sensing signal from a touch lead; and providing a touch drive signal to the corresponding touch lead according to the touch sensing signal.

Figure 15:
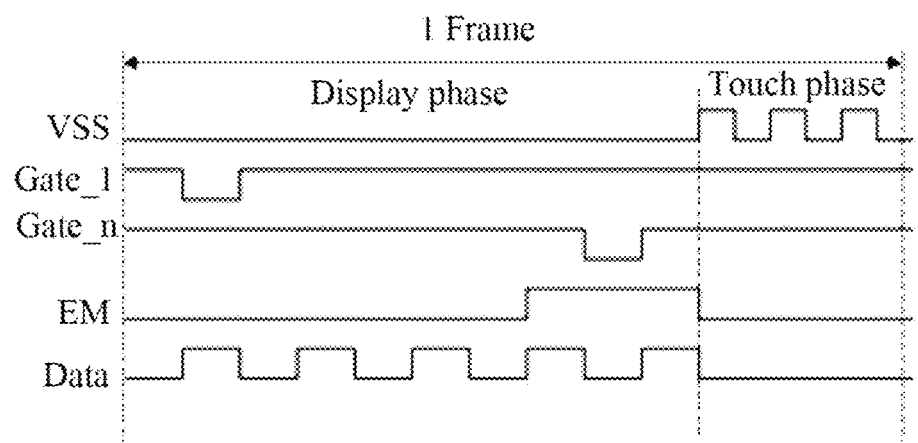
FIG. 15 is a timing diagram of a working process of a pixel drive circuit in a touch display substrate provided by an exemplary embodiment of the present disclosure.
Figure 16:
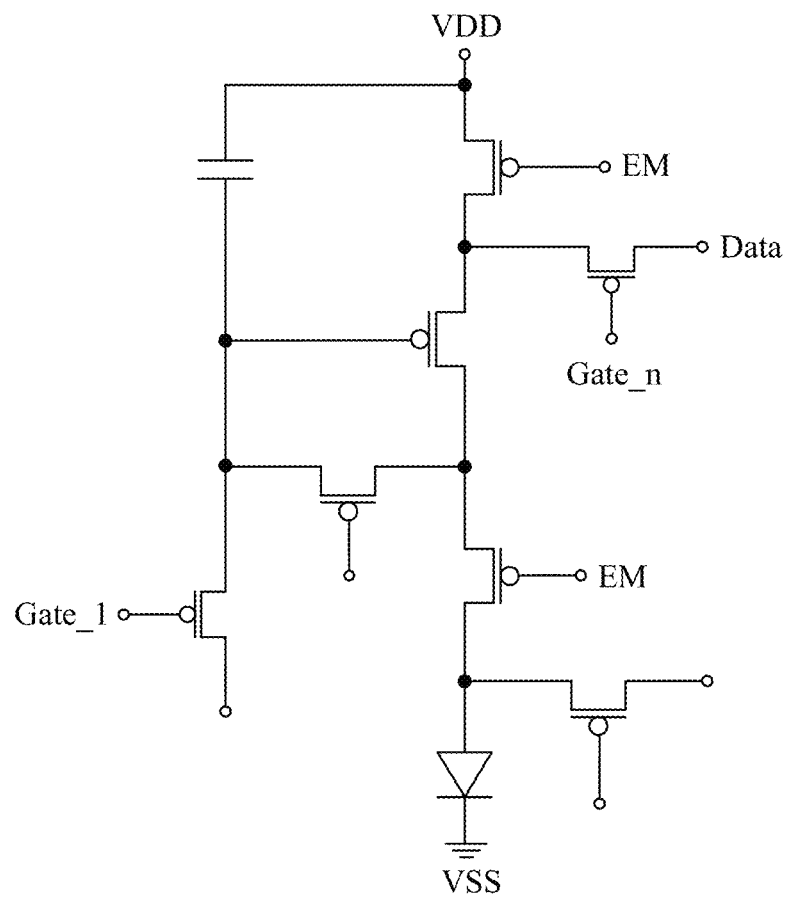
FIG. 16 is an equivalent circuit diagram of a pixel drive circuit in a touch display substrate provided by an exemplary embodiment of the present disclosure.

In an exemplary implementation mode, the touch display substrate may include a plurality of sub-pixels arranged in an array, and an equivalent circuit diagram of a pixel drive circuit of each sub-pixel may be shown in FIG. 16, and FIG. 15 is a timing diagram of a working process of the pixel drive circuit shown in FIG. 16, wherein VSS, Gate_1, Gate_n, EM, and Data in FIG. 15 respectively represent a timing diagram of a working process of the lines VSS, Gate_1, Gate_n, EM, and Data in the pixel drive circuit shown in FIG. 16, and a VSS signal is a signal provided by a touch lead 11-1 to a touch electrode 13-1 (i.e., a cathode 13-1). In a display phase, a touch chip 410 (i.e., a touch drive circuit 410) may provide a second power supply voltage VSS to the touch electrode 13-1 through the touch lead 11-1, and in a touch phase, the touch chip 410 (i.e., the touch drive circuit 410) may receive a touch sensing signal of the touch electrode 13-1 through the touch lead 11-1 and provide a touch drive signal to the touch electrode 13-1 through the touch lead 11-1.

According to the touch display substrate, the drive method thereof, and the touch control display apparatus provided by the embodiments of the present disclosure, in the touch display substrate, a plurality of cathodes are multiplexed as touch electrodes, the plurality of touch electrodes are electrically connected with a plurality of touch leads in the touch lead layer through a plurality of transfer connection electrodes in the anode conductive layer, and the plurality of touch leads are located in a display region of the touch display substrate, so that the plurality of touch leads and cathodes in the touch display substrate do not need to occupy a bezel, thus greatly reducing the bezel of the touch display substrate and reducing a difficulty of a bezel narrowing design of the touch display substrate.

The drawings of the present disclosure only involve structures involved in the present disclosure, and other structures may be referred to conventional designs. The embodiments of the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

The invention claimed is:

1. A touch display substrate, comprising a base substrate, and a touch lead layer, an anode conductive layer, and a cathode conductive layer disposed on the base substrate, wherein on a plane perpendicular to the base substrate, the anode conductive layer is located between the touch lead layer and the cathode conductive layer, the anode conductive layer comprises a plurality of transfer connection electrodes, the touch lead layer comprises a plurality of touch leads, and the cathode conductive layer comprises a plurality of cathodes; the plurality of cathodes are multiplexed as a plurality of touch electrodes, the plurality of touch electrodes are electrically connected with the plurality of touch leads through the plurality of transfer connection electrodes, and at least part of the touch leads are located in a display region of the touch display substrate.

2. The touch display substrate according to claim 1, wherein the anode conductive layer further comprises a plurality of dummy electrodes, and the plurality of dummy electrodes and the plurality of transfer connection electrodes form an electrode array arranged in rows and columns.

3. The touch display substrate according to claim 2, wherein the plurality of touch electrodes are arranged in an array, orthographic projections of the plurality of dummy electrodes and the plurality of transfer connection electrodes on the base substrate are within a range of orthographic projections of the plurality of touch electrodes on the base substrate, and the electrode array comprises a plurality of electrode sub-arrays corresponding to the plurality of touch electrodes.

4. The touch display substrate according to claim 3, wherein a pixel definition layer is disposed between the anode conductive layer and the cathode conductive layer, the pixel definition layer is provided with a plurality of first transfer vias, and the plurality of touch electrodes are electrically connected with the plurality of transfer connection electrodes through the plurality of first transfer vias; a planarization layer is disposed between the touch lead layer and the anode conductive layer, and a plurality of second transfer vias are disposed on the planarization layer, and the plurality of transfer connection electrodes are electrically connected with the plurality of touch leads through the plurality of second transfer vias.

5. The touch display substrate according to claim 4, wherein the pixel definition layer is further provided with a plurality of first dummy vias, orthographic projections of the plurality of first dummy vias on the base substrate are respectively within a range of orthographic projections of the plurality of dummy electrodes on the base substrate;

orthographic projections of the plurality of first transfer vias on the base substrate are respectively within a range of orthographic projections of a corresponding plurality of transfer connection electrodes on the base substrate.

6. The touch display substrate according to claim 4, wherein the planarization layer is further provided with a plurality of second dummy vias, orthographic projections of the plurality of second dummy vias on the base substrate are respectively within a range of orthographic projections of the plurality of dummy electrodes on the base substrate;

orthographic projections of the plurality of second transfer vias on the base substrate are respectively within a range of orthographic projections of the plurality of transfer connection electrodes on the base substrate.

7. The touch display substrate according to claim 6, wherein the plurality of second dummy vias and the plurality of second transfer vias form a second via array arranged in rows and columns, the second via array comprises a plurality of second via sub-arrays respectively corresponding to the plurality of touch electrodes, and arrangement modes of vias in the plurality of second via sub-arrays are consistent.

8. The touch display substrate according to claim 3, wherein one cathode is electrically connected with at least one touch lead, one touch lead is electrically connected with one of the cathodes, and second supply voltages received by cathodes located in different rows from corresponding touch leads are different.

9. The touch display substrate according to claim 8, wherein the touch display substrate comprises the display region and a bonding region located on one side of the display region, and in a direction from the bonding region to the display region, absolute values of second power supply voltages received by a plurality of rows of cathodes from corresponding touch leads are sequentially incremented.

10. The touch display substrate according to claim 3, wherein two adjacent touch electrodes located in a same row are misaligned in a column direction, to enable a gap between two adjacent columns of cathodes to be not in a straight line; two adjacent touch electrodes located in a same column are misaligned in a row direction, to enable a gap between two adjacent rows of cathodes to be not in a straight line.

11. The touch display substrate according to claim 3, wherein a plurality of convex structures are disposed at edge positions of the cathodes in an irregular manner to enable a gap between two adjacent rows of cathodes and a gap between two adjacent columns of cathodes to be not in a straight line.

12. The touch display substrate according to claim 2, wherein the touch display substrate comprises the display region and a bonding region located on one side of the display region, the plurality of touch leads extend from the bonding region to the display region, and in a direction from the bonding region to the display region, the plurality of touch leads penetrate through the display region.

13. The touch display substrate according to claim 12, wherein the display region is provided with a plurality of pixel units arranged in an array, and any one of the pixel units corresponds to one dummy electrode or one transfer connection electrode.

14. The touch display substrate according to claim 1, wherein the touch display substrate comprises a drive circuit layer disposed on the base substrate, the drive circuit layer is located between the anode conductive layer and the base substrate, the drive circuit layer comprises one or more source-drain metal layers, one of the source-drain metal layers is multiplexed as the touch lead layer.

15. The touch display substrate according to claim 14, wherein on a plane parallel to the touch display substrate, the plurality of touch leads extend along a second direction and are uniformly arranged along a first direction, and the first direction intersects with the second direction.

16. A touch display apparatus, comprising a touch display substrate according to claim 1.

17. A drive method of a touch display substrate, applied to the touch display substrate according to claim 1, wherein the touch display substrate comprises a base substrate, and a touch lead layer, an anode conductive layer, and a cathode conductive layer disposed on the base substrate, on a plane perpendicular to the base substrate, the anode conductive layer is located between the touch lead layer and the cathode conductive layer, the anode conductive layer comprises a plurality of transfer connection electrodes, the touch lead layer comprises a plurality of touch leads, and the cathode conductive layer comprises a plurality of cathodes arranged in an array; the plurality of cathodes are multiplexed as a plurality of touch electrodes, the plurality of touch electrodes are electrically connected with the plurality of touch leads through the plurality of transfer connection electrodes, at least part of the touch leads are located in a display region of the touch display substrate and extend to a bonding region located on one side of the display region;

the method comprises:
providing different second power supply voltages to touch leads electrically connected with cathodes in different rows.

18. The drive method of the touch display substrate according to claim 17, wherein the providing different second power supply voltages to touch leads electrically connected with cathodes in different rows comprises:
sequentially incrementing absolute values of second power supply voltages provided to a plurality of rows of cathodes sequentially arranged in a direction from the bonding region to the display region through a plurality of touch leads.

19. The drive method of the touch display substrate according to claim 18, wherein one cathode is electrically connected with a plurality of touch leads through a plurality of transfer connection electrodes;
second power supply voltages provided to a plurality of touch leads electrically connected with a same cathode are the same; or, absolute values of second power supply voltages provided to a plurality of touch leads electrically connected with a same cathode in the direction from the bonding region to the display region are sequentially incremented.

20. The drive method of the touch display substrate according to claim 17, wherein the method further comprises:
receiving a touch sensing signal from a touch lead; and
providing a touch drive signal to a corresponding touch lead according to the touch sensing signal.

* * * * *